United States Patent
Hudson, Jr.

(10) Patent No.: US 9,894,038 B2
(45) Date of Patent: Feb. 13, 2018

(54) SYSTEM SECURITY FOR NETWORK RESOURCE ACCESS USING CROSS-FIREWALL CODED REQUESTS

(71) Applicant: James Thomas Hudson, Jr., Grapevine, TX (US)

(72) Inventor: James Thomas Hudson, Jr., Grapevine, TX (US)

( * ) Notice: Subject to any disclaimer, the term of this patent is extended or adjusted under 35 U.S.C. 154(b) by 0 days.

(21) Appl. No.: 14/815,382

(22) Filed: Jul. 31, 2015

(65) Prior Publication Data

US 2017/0187685 A1    Jun. 29, 2017

Related U.S. Application Data

(63) Continuation of application No. 13/066,532, filed on Apr. 18, 2011, now Pat. No. 9,106,624.

(60) Provisional application No. 61/345,141, filed on May 16, 2010.

(51) Int. Cl.
*H04L 29/06* (2006.01)

(52) U.S. Cl.
CPC .......... *H04L 63/0263* (2013.01); *H04L 63/10* (2013.01); *H04L 63/1416* (2013.01); *H04L 63/1441* (2013.01); *H04L 63/20* (2013.01); *H04L 67/42* (2013.01)

(58) Field of Classification Search
CPC ............. H04L 63/0457; H04L 63/1441; H04L 63/1416; H04L 63/102
See application file for complete search history.

(56) References Cited

U.S. PATENT DOCUMENTS

| | | |
|---|---|---|
| 3,829,833 A | 8/1974 | Freeny, Jr. |
| 3,931,504 A | 1/1976 | Jacoby |
| 5,671,279 A | 9/1997 | Elgamal |
| 5,680,461 A | 10/1997 | McManis |
| 5,933,498 A | 8/1999 | Schneck et al. |
| 6,185,683 B1 | 2/2001 | Ginter et al. |
| 6,845,452 B1 | 1/2005 | Roddy et al. |
| 7,900,038 B2 | 3/2011 | Suto et al. |
| 7,900,249 B2 | 3/2011 | Burcham et al. |
| 7,904,721 B2 | 3/2011 | Belenky et al. |
| 7,904,727 B2 | 3/2011 | Bleckmann et al. |
| 7,904,950 B2 | 3/2011 | Yeom |
| 7,908,475 B2 | 3/2011 | Smith et al. |
| 7,908,643 B2 | 3/2011 | Huotari et al. |
| 7,908,653 B2 | 3/2011 | Brickell et al. |
| 7,913,292 B2 | 3/2011 | Hartrell et al. |
| 7,916,656 B2 | 3/2011 | Davis |
| 7,917,584 B2 | 3/2011 | Arthursson |
| 7,917,941 B2 | 3/2011 | Wallman |
| 7,917,942 B2 | 3/2011 | Costa-Requena et al. |
| 9,106,624 B2 * | 8/2015 | Hudson, Jr. ......... H04L 63/0457 |

(Continued)

*Primary Examiner* — Baotran N To
(74) *Attorney, Agent, or Firm* — James L. Baudino

(57) ABSTRACT

A system includes a firewall, a first server located behind the firewall, and a second server located before the firewall. The second server is configured to receive a request for data, select an item code from a code database corresponding to the requested data, and transmit the item code to the first server, wherein the item code comprises a coded number representing an item in a secure database. The first server is configured to receive the item code from the second server and, if the item code corresponds to one of a plurality of codes of a code database maintained by the first server, send the data to the second server.

20 Claims, 30 Drawing Sheets

(56) References Cited

U.S. PATENT DOCUMENTS

| | | |
|---|---|---|
| 2004/0010519 A1 | 1/2004 | Sinn et al. |
| 2005/0086187 A1 | 4/2005 | Grosser et al. |
| 2007/0204338 A1 | 8/2007 | Aiello et al. |

* cited by examiner

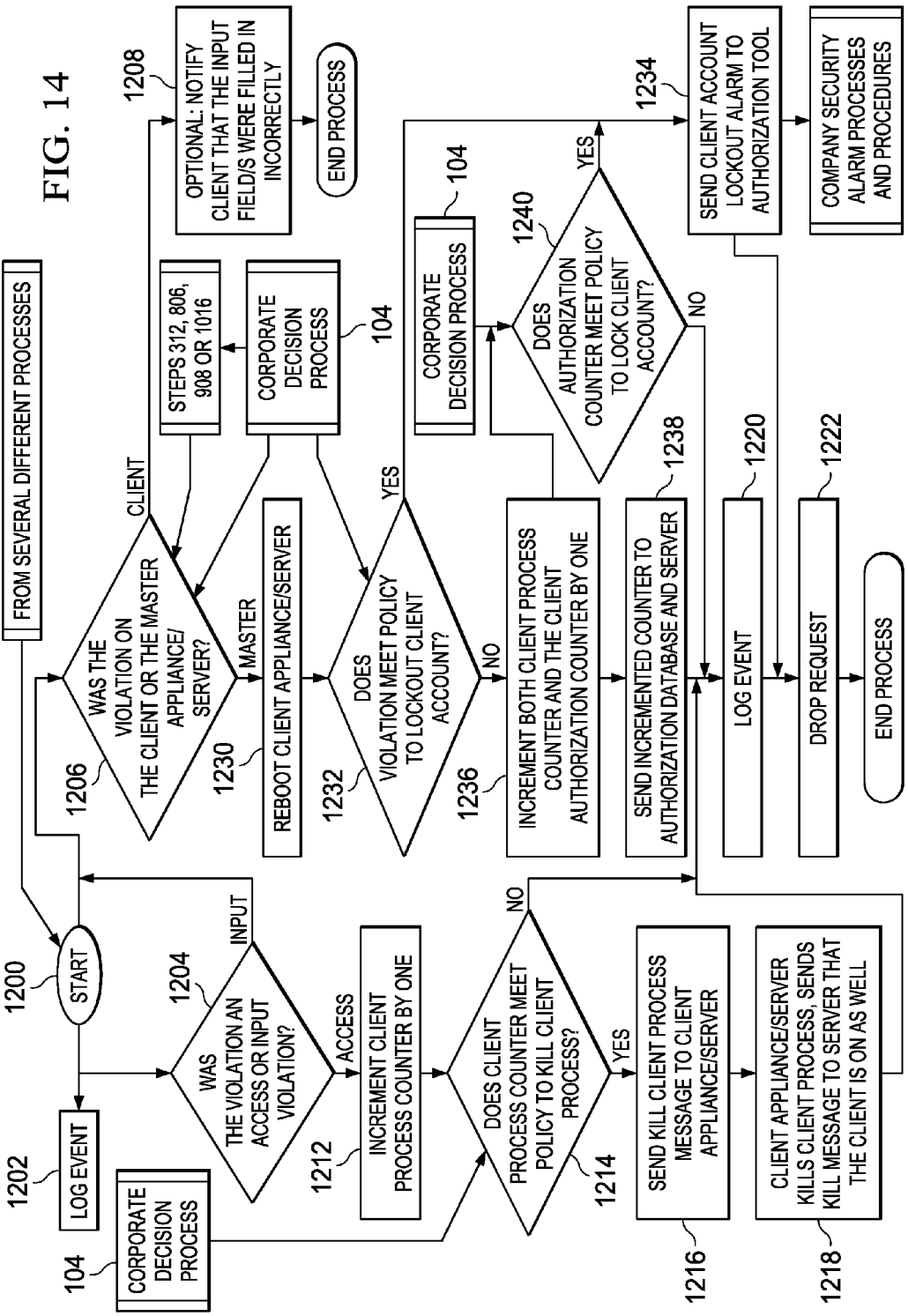

SYSTEM SECURITY FOR NETWORK RESOURCE ACCESS USING CROSS-FIREWALL CODED REQUESTS

BACKGROUND

There are 2 primary problems with secure information handling. The first is that the idea that most secure information released needs to be complete to be recognized as valid. This is not the case with complicated records. For example an individual wants to go to a car dealership to purchase a car on credit. It is thought that credit information required needs to be complete; this is false, what the credit officer needs to know is if the person before him/her is actually the person that is reflected on the credit report and what the credit score is as well as any comments on past credit history. Therefore the personal identification information like a driver's license number coupled with the last 4 digits of the SSN and the birth date will provide that proof of identification. The credit data is information that needs to be complete but the personal information that is utilized by thieves is still secure.

The second idea that is invalid is that the device that handles the secure information needs to be the same device that is used to access the information. This is particularly true of web access systems. What is needed is a type of version of the same system that humans utilize. The person responsible for securing the information is a different person who is responsible for the utilization of that same information. This system works well for people and will work well for computers. While the design philosophy that a user be allowed to directly access the information is more efficient (Please note the idea has driven the design of computer systems for over 40 years) it has not been successful in handling secure information.

There has been an attempt in doing this with the utilization of a "Secure" information vault on a server. The problem that faces security teams is that when hackers access a server, they always end up with the server's administrator privileges. This means that the "Secure" information vault now is controlled by the intruder. Once you loose the control, you loose the information. It is either compromised to outside sources or destroyed.

BRIEF SUMMARY

The present invention relates to providing system security to network access of applications and data. This happens through the use of currently available security system (firewalls, bastion routers etc.) and the addition of a set of appliances/servers. The purpose of the additional software and hardware allows for the screening of all requests for security information. As a result we end up with a whole security equation that prevents all external access "Hacking" into secure data systems and we can still allow access to the data to those users who need it. This patent also lends itself to being able to be ported over to a hardware/firmware design. If latency is an issue, it is expected that when the software migrates to using modern ASIC hardware technology, the added delay that the new systems impose will be reduced enough that it will be acceptable to the user community. A process has been designed to reduce latency issues in software designs.

What this patent does is allow the system that allows users of information to be separated from the systems that secure the information. We do this the same way we do it in a human system. This is a universal standard and has been codified through the use of SOX standards. Current SOX standards do not require electronic systems to be separated like human systems are because the current state-of-the-art does not allow for it.

For this method and system we utilize an electronic form, or digital code for a specific piece of secure information. By using a specific code we don't respond to other inquiries that would allow a secure storage system to be compromised. This specific code can be hidden within a larger digital word so as to escape detection if the information stream is intercepted.

The result of this is that when a hacker attacks a peering server and gains control over the server, the most information that the hacker can gain is the temporary access to the actual codes and not the information itself. Since we confirm, through other means, users privileges for access to information even if an outside person knows a current code for a limited amount of time (codes can change as frequently as the system is set up for) an unauthorized user cannot gain access to secure information.

The system is also set up so as to allow up to release certain portions of the data if that is what is required. Since we only release portions of the confidential information to the outside access points, an attacker who wishes to use an approved provider's credentials such as a loan approver, the attacker gains are never seen because we only let the portion of the data out that proves to the approver a specific point. Normally it is something like identification and/or a credit score. Of these only the credit data needs to be complete, no personal identification data needs to be complete. The attacker would have to enter the complete ID set, but the system does not need to provide the complete set back. For internal applications the same can also be done to all access points except from a trusted subnet. The trusted subnet is required for server and data maintenance and cannot be avoided. Please note that for external data access it is recommended that all access ports, except for the single port that is used to access the master device from the client device, be turned off. For internal devices there is more freedom in allowing more ports to be open, but the more that are open the greater chance that the secure system can be compromised.

This is not a firewall because a firewall has to allow for different types of data in a steady stream of communications traffic into out of a network. While that traffic stream needs to respond to specific rules, the firewall just reduces traffic it does not necessarily stop it. Therefore this device is really an appliance as it does a very specific thing very well, very fast. This also utilizes an encryption method that can be subjected to interception. Once the codes are known, then the information stream can be intercepted and read. This is the reason why client data should be encrypted utilizing one of several secure methods.

This is not a proxy server because proxy servers redirect traffic and hide the internal addresses to the outside world. While this patent does allow for the redirection of traffic, the processes of a proxy server are not monitored by intrusion detection devices and the proxy server is not set up to automatically "kill" an intrusive process.

Since the appliance monitors the program file permissions it is also able to handle intrusions faster and according to a specific policy. The most benign would just to notify network security, it would also be able to change the file permissions back to the way they were before an intrusion as well as close down the user process that caused the break down in security. If all else fails the external device could be reloaded and the server configurations would come from an internal master server.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 14 is the Violations Process 1200—This process tracks what will be done for several conditions that can occur when a user attempt to access data that does not meet their privilege levels;

DETAILED DESCRIPTION

Figure 1:
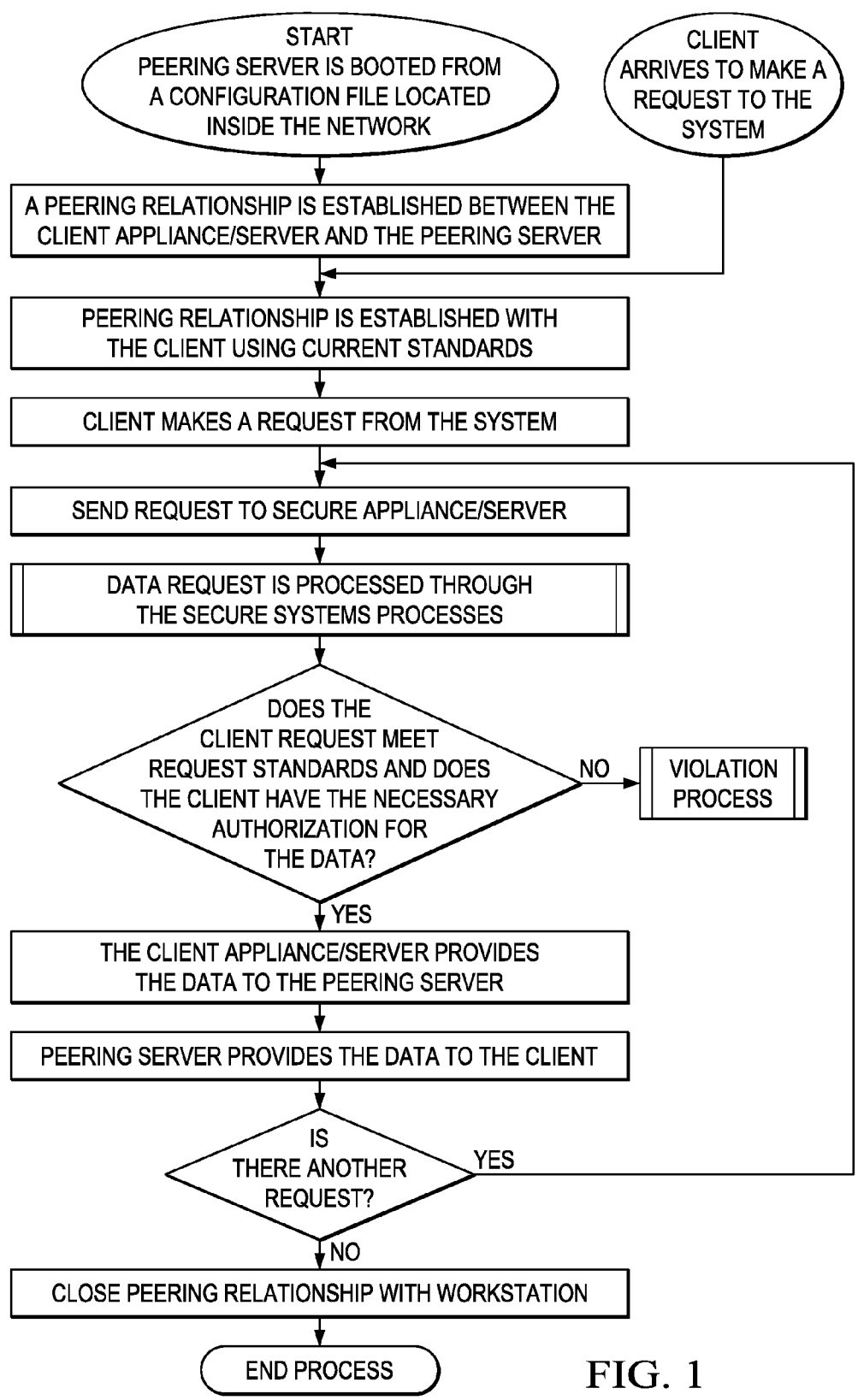
FIG. 1 is a general process diagram—this is used to track how the system works in a general form.

This patent is a continuation of the work that this inventor did when he filed provisional patent application 61/345,141. Prior art requires a peering relationship between the server and the workstation that is requesting the information. This is efficient and conserves resources particularly on a server where shared resources are at a premium. This was particularly import in the very beginning of the computer industry because internal bus speeds were slow compared to more modern systems and the cost per cycle were extremely high. Now that costs per cycle have been significantly reduced we should look at alternate means of communicating so as to provide better means of secure information processing.

A direct peering relationship is not necessary and is one of the reasons why computer systems are vulnerable to outside entities. What this system does is allow for a peering relationship between the site providing the information on a peering server and it allows for a separate process that the peering server uses to get the required information. Using this set of processes allows for further separation of the secure information source from that of the server that provides the peering relationship. As a result the secure data is not at risk should an outside attacker gain access to the peering server. It allows for the disconnection of that outside attacker from the peering server and still allow for the possibility of continued service to others but as a last resort the peering server can be rebooted and since the peering server's configurations are located at a separate secure location any attackers code that may have been inserted is ignored.

Please note that this is not a firewall service because the firewall has to allow data flow so long as it meets a certain set of criteria within the data header. This is a major difference in that we are looking for a specific code in order to allow a data request to go through. This is also not a proxy server as a proxy server redirects traffic to another server, thus hiding the actual network addresses from a possible attacker. While this does redirect traffic we also monitor privileges of the peering server to make sure it is not under attack. We are also capable of removing any session that attempts to take over the proxy server and we can finally reboot the peering serve as well. None of these functions are part of a proxy server's function.

We need to think of the security of electronic documents in the same way we think of the security of hard copy documents. Utilizing the state-of-the-art in network security we have bastions, these are like the outer perimeter of a military base. We have bastion routers these are like the gates at the front gate that you use a pass card to get through. We have proxy servers that act like a second type of fence as they hide the facility for the outside. This area between the bastion router and the firewall is often called the "DMZ," can also contain public information servers or web servers. The last set of electronic barriers that is normally seen is a final set of firewalls between the DMZ and the internal network. At this point the company often separates internal data with internal company VLANs and often there is a set of firewalls leading to the most important company information.

With the current state-of-the-art what we really have is a set of "fences" to keep attackers out. We can keep people out but we really are not monitoring the "fences" to make sure that attackers are not going over, under or through them. This is different from our physical security because we have people who monitor the fences and if you try to come in over, through or under the fence they can catch you, wound you or worse. In electronic security you can think of information tunnels as a way of going over or under the fence. Our internal systems have a difficult time of handling these sorts of information streams because they are unable to look at the actual packets within the tunnel. They can only evaluate the tunnel packets and not the payload encapsulated within the tunnel itself. This kind of assault normally requires inside help but automated tools can set up tunnels as well. It just requires time to get your tool inside.

Physical security also has the added advantage of placing a person, a security clerk, between the requester of information and the information itself. This means that the individual requesting the data needs to know what it is that they want. The only inventory of the sensitive information is within the secure vault itself. If an electronic attacker gains access to a server they have access to that server's directory, the information inventory. The security clerk can also dictate the method of how the information is to be reviewed. People cannot just ask for the information and walk out again.

The current state-of-the-art has nothing like this, until now. With the incorporation of a MiMs (Man-in-the-Middle Set) we can do a couple of things. We still utilize our current tools suite. We still need our electronic "fences." What we add is an electronic security clerk. Our clerk is capable of making sure that the file that is requested is the only file that is delivered. It is capable of making sure that the file directory is secure, and is also capable of monitoring its MiMs mate to make sure that its processes are not violated. Our electronic clerk can now "kill" attacking processes or even kill its MiMs make if it is necessary to prevent an attacker from taking over and gaining access to the internal network.

MiMs units are installed in pairs the first one can be located forward of the firewall to the secure data. The proxy, web or peering servers are pointed to the first unit of the MiMs pair. The forward MiMs unit is also known as a sacrificial or client unit. Its processes are monitored by the second MiMs unit. The second MiMs unit makes sure that the internal processes of the first MiMs unit are not corrupted by an attacker it needs to be located behind the final firewall. Should the first MiMs detect an intrusion then it notifies the 2nd MiMs unit and attempts to shut down the attacking process. If it fails then the second MiMs unit has the option of shutting down the attacking process and if that fails to reboot the first MiMs unit.

The first MiMs unit is responsible for accepting a data request and converting it into a MiMs relevant code it is also capable of monitoring proxy, web or peering servers. This code directly corresponds to a specific type of data request. The second MiMs listens for these specific requests and responds only to these requests. The second MiMs unit only responds to the specific coded requests from the first MiMs unit. These coded requests can be hidden within a larger 128 bit (or larger) word. If larger numbers of databases queries are required we can incorporate them as the code and/or encryption schema are not dependent upon specific bit sizes. The 128 bit size was chosen as a starter sequence as it was easier to explain in this document but we can expand the bit size. As the encryption schema is also a 1 time pad type of schema the same word does not have to be used consistently and as a result can be a very robust schema. When we get to the encryption process bit size choice can be explained. We are utilizing this encryption schema because we need to make sure that if the data stream is intercepted it cannot be easily read by a packet sniffer. The first MiMs can also be utilized to monitor the processes of a web or proxy server or could run as a client on a web or proxy server. If the first MiMs unit sees abnormalities on the web or proxy server it can also be set up to notify the web or proxy server to "kill" a specific process or even have the proxy or web server rebooted. The same processes that are used to monitor the first MiMs unit in the pair can also be utilized to monitor the proxy or web devices.

The biggest advantage to being able to monitor these devices is that it gives the system an ability to self monitor and recover from an attempted attack and still give the possibility of continued service. Utilizing the system as a web/proxy/peering server monitor and then as a MiMs monitor process provides us with a defense in depth against data access attacks.

The second MiMs unit accepts the code or the encoded sequence and parses out the encoded command. The second MIMs compares the encoded command to an internal command list. This list contains the specifics about what to do with the command. The database contains the address of the server the command needs to go to retrieve the information, or to the server that needs to receive the information string. If it is to receive a particular information string it also needs to know how long the string field is as well. If the data in that string violates the parameters the data is rejected.

FIG. 1 is a general process diagram—This is used to describe the general track that is happening with the system. When a peering server or a MiMs unit is first booted it gets its configuration from an internal source. "BootP" or "DHCP" type protocols already exist and are already standards they are needed to accomplish the mission of getting the booting configurations to the MiMs unit or Peering server but are not part of this patent. After the unit is booted a client request can be accepted by the device. The first MiMs unit establishes a relationship between all servers that it serves as well as the Master Mims unit.

If it is a peering server then the server establishes a relationship to the user's workstation. The peering server then takes the request (note: the request can be an input or output request) and sends the request as well as user authorization information to the first MiMs unit. The Peering server then provides a countdown to the user as to what hurdles the request is going through prior to getting the data. This can be anything from the standard hourglass to an actual step-by-step count of where the data request is in the handling system.

The first MiMs unit accepts the request and goes through an initial authorization matching utilizing the company's authorization tools. The request is matches with the proper code and sent to the Master MiMs unit and is processed according to process. If there is a violation of the codes then it is possible that the information stream may have been intercepted and the request is handled by the violations process. The authorization process or the monitoring processes may issues then the packet is handed to the violation process as well.

The data is sent back to the Master MiMs unit and from there to the first MiMs unit and then on to the proxy, web or peering server and then it goes to the client. If there are more requests they are then sent back on to the first MiMs unit, if no more requests are needed the relationship between the user workstation and the web or peering server is shut down and the user session ends.

Figure 2A:
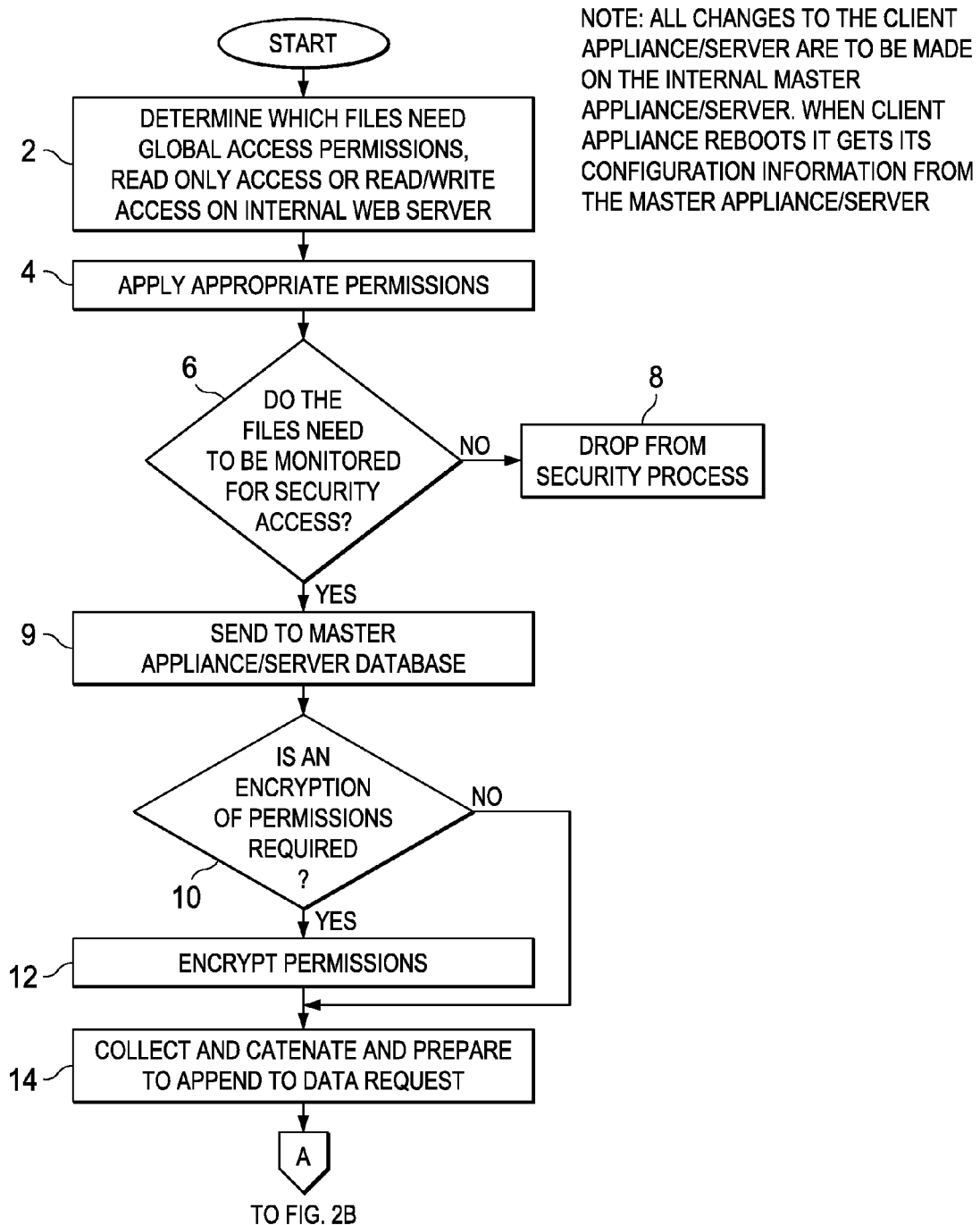
FIGS. 2A-2B are a General Flow Process diagram—This outlines general process flow and defines some constants.
Figure 2B:
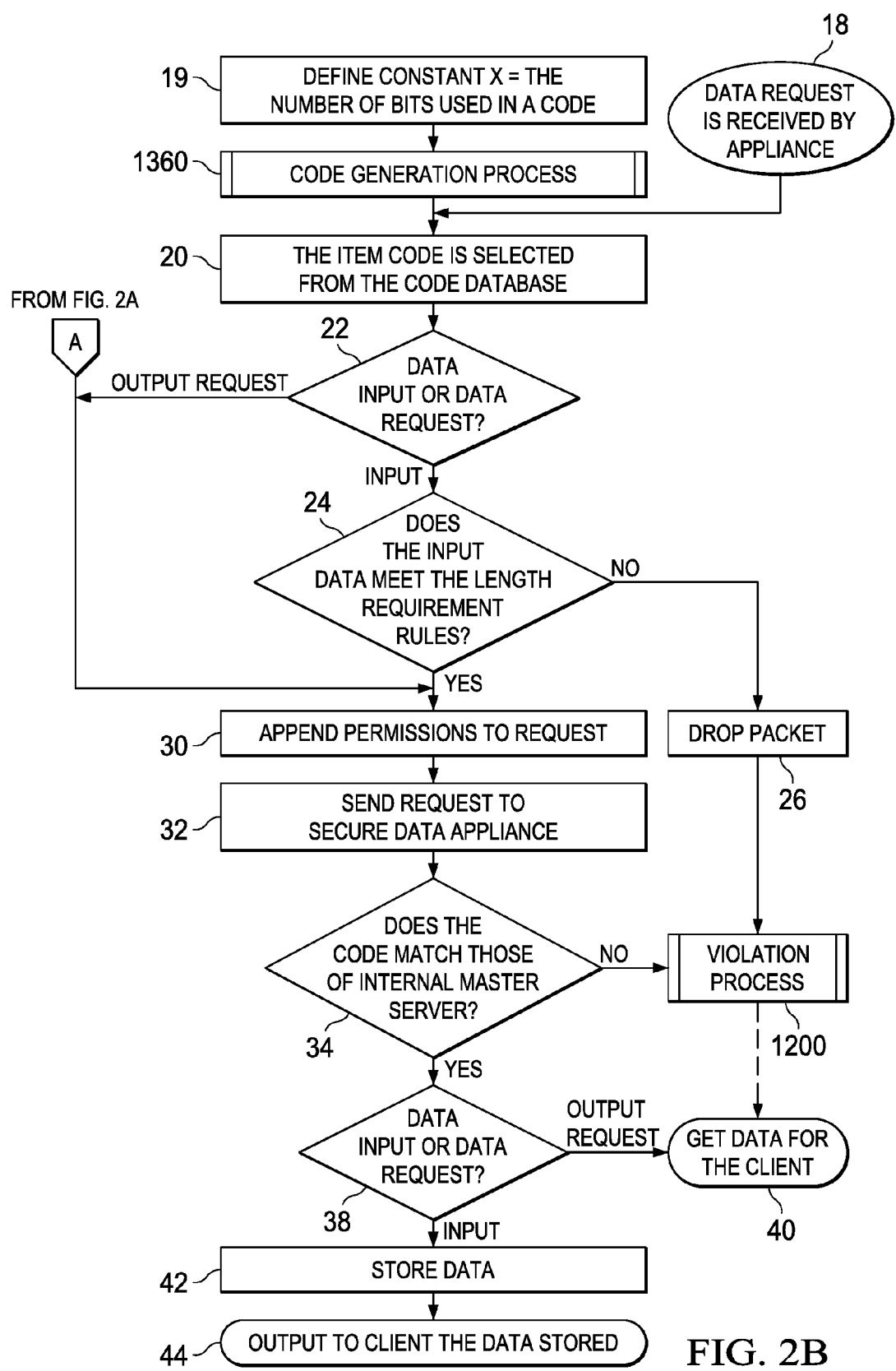
Figure 3A:
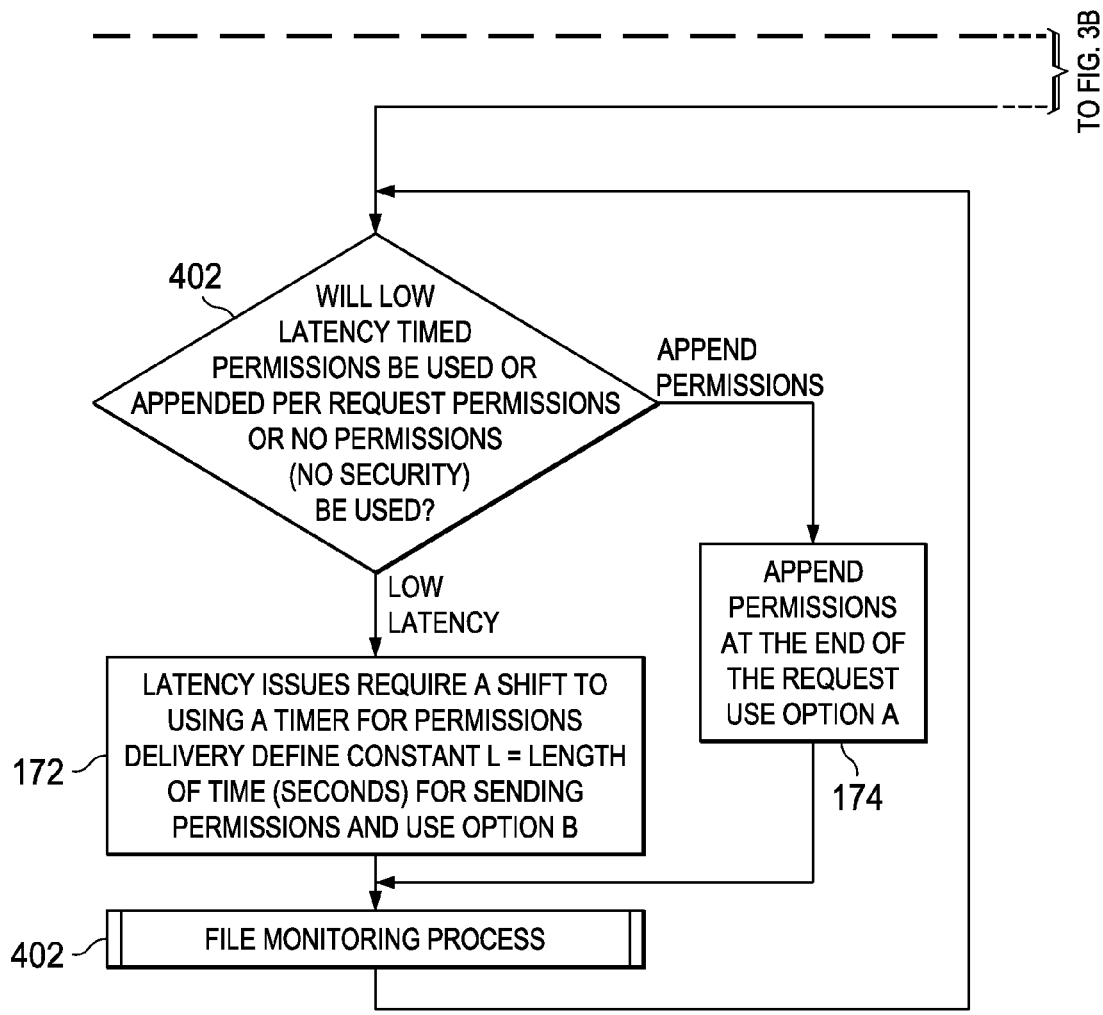
FIGS. 3A-3D are a Corporate Decision Flow Process 100—This defines more constants and variables; it also directs corporate decisions as to what process flows to take depending on decisions made.
Figure 3B:
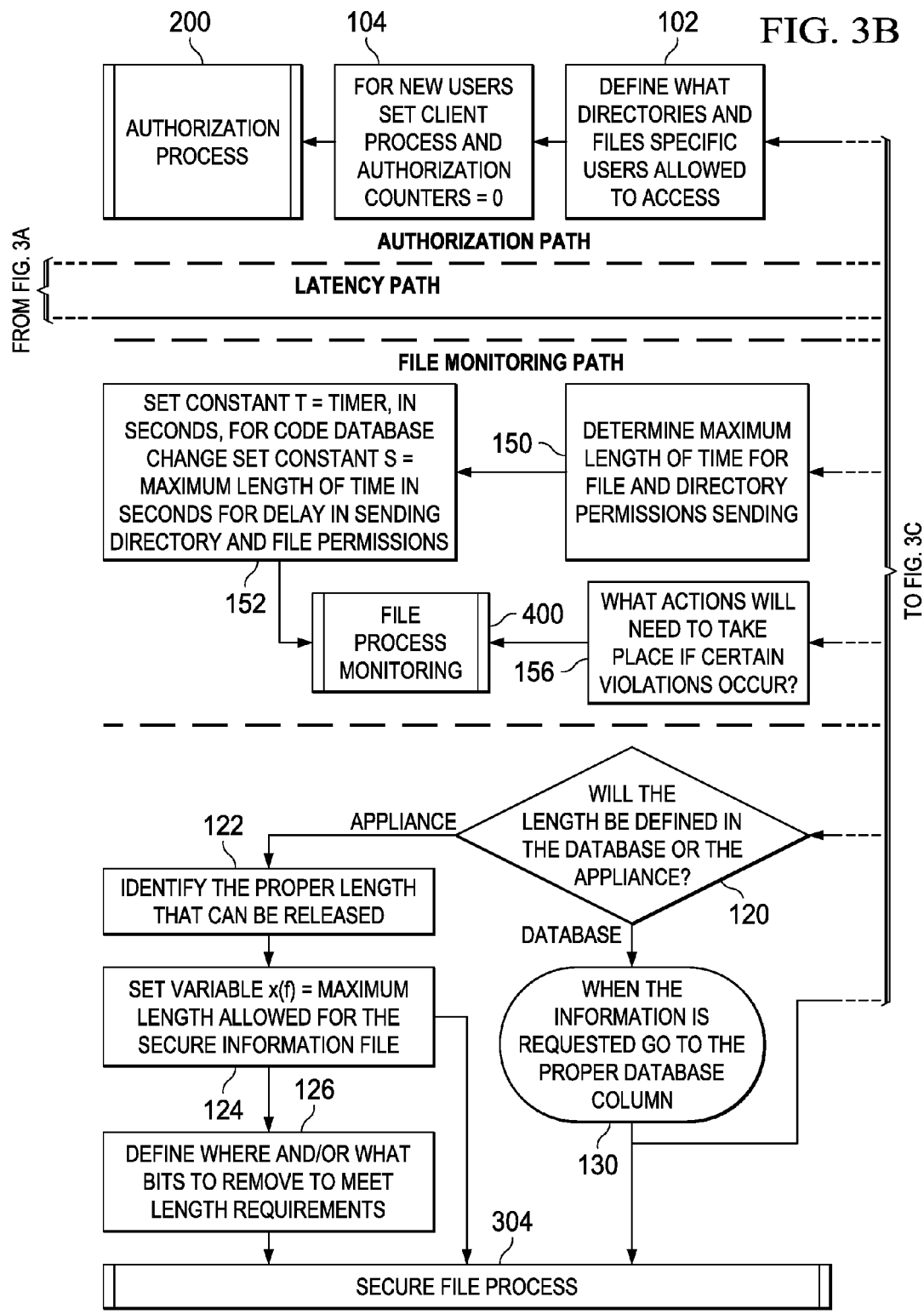
Figure 3C:
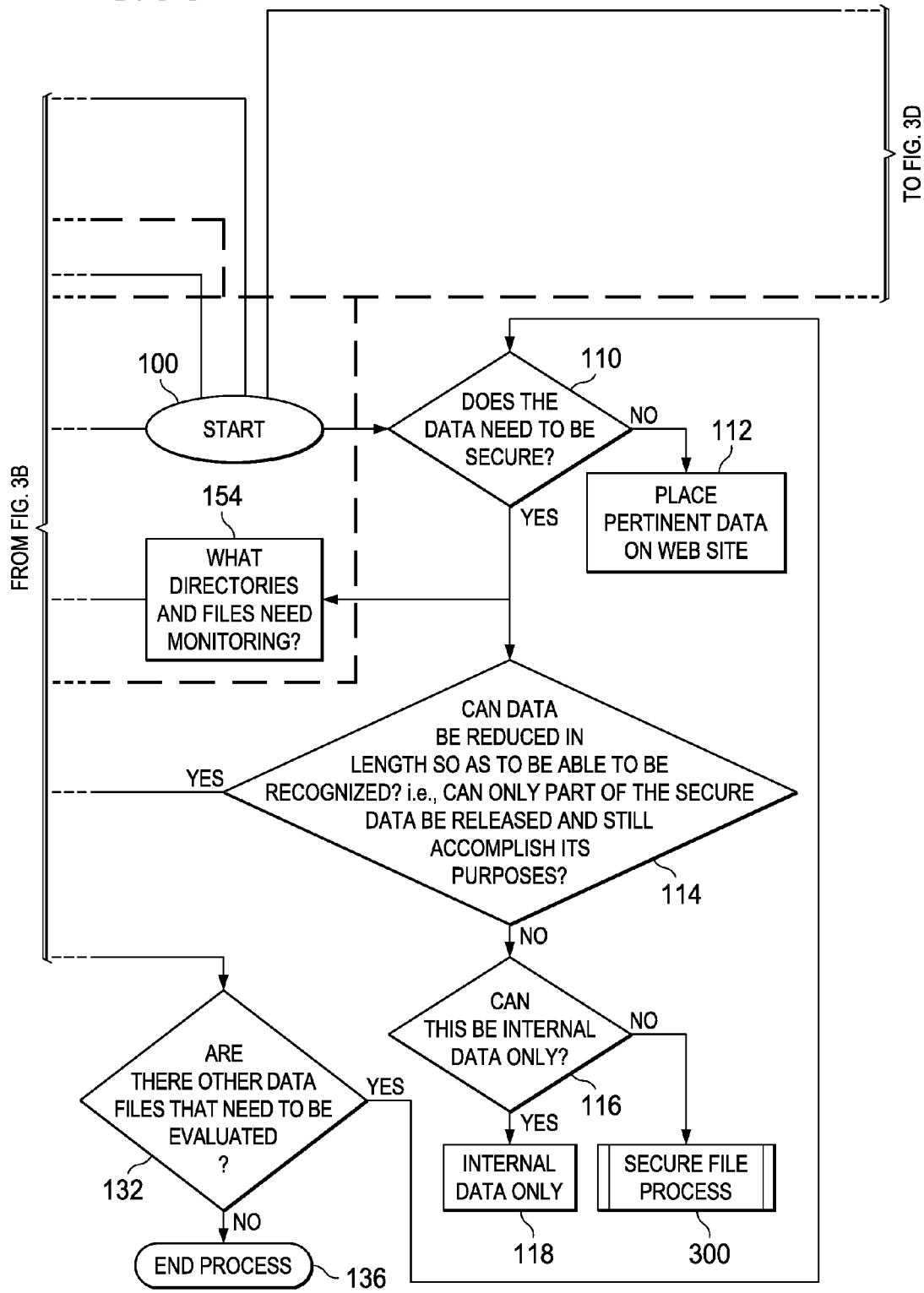
Figure 3D:
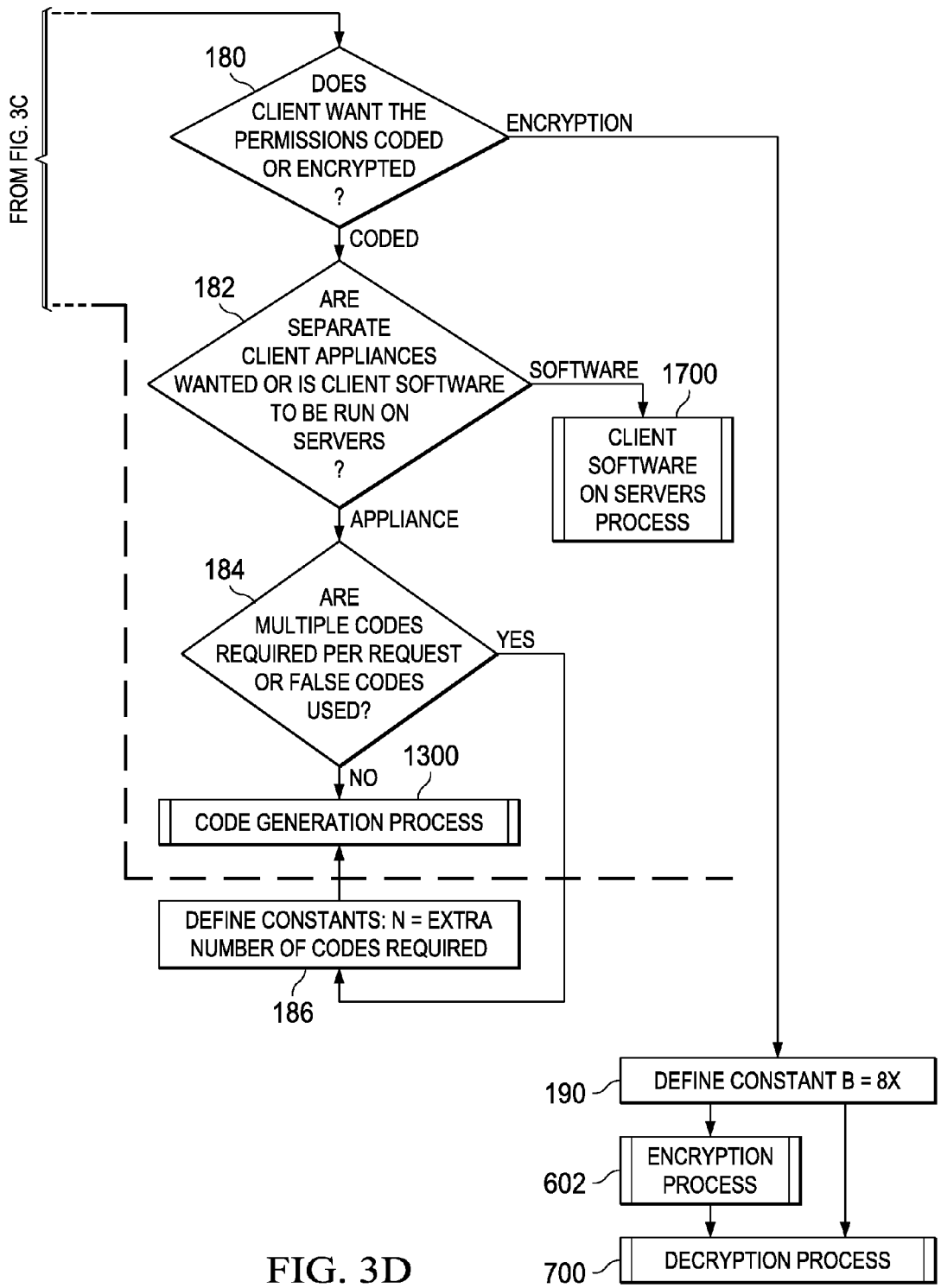

FIGS. 2A-2B are a General Flow Process diagram. Step 2—requires the management team to determine which files and directories need secure access and what type of access those files require. Step 4—has those permissions assigned to those files. Step 6—Are the files monitored for security? If no go to step 8; if yes go to step 9—step 8—Drop file from security monitoring process—step 9—send permissions to the master appliance/server database step 10—Is an encryption of security permissions required? If yes go to step 12; if no go to step 14—step 12—Encrypt permissions—step 14 collect and prepare permissions send—step 18—Data request is received by appliance—step 20—the item code is selected from the code database—step 22—Is this a data request or a data input? If input then go to step 24; if request go to step 30—step 24—Does the input data meet the length requirement rules? If yes go to step 30; if no go to step 26—step 26—Drop the request and processed to step 1206 the Violation process—step 30—for both the data request and the data input append the permissions to the request—step 32—send the request to the secure data appliance—step 34—Does the code match one of the internal codes of the master server? If yes go to step 38, if no go to step 1206 the Violation process—step 38 Is this an input or data request? If input go to step 42; if output go to step 40—step 40—get the data for the client and send it to him—step 42—store the client data—step 44—send the client back the data that was stored.

This is the general process flow the rest of the diagrams are more specific as to how this is accomplished.

FIGS. 3A-3D are a Corporate Decision Flow Process—step 102—Define what directories and files specific users have access to—step 104—For new users set client processes and authorization counters to zero (0)—provide information to the Authorization Process (200)—step 106—Determine the number of bits required for the code length—step 108—set constant X=code bit size, provide to 1300 Code Generation process—Step 110—Does the data need to be secure? If no go to step 112; if yes go to step 114 and 154—step 112—this data can be placed on the public site—step 114—can the data be reduced in length so as to still be able to be used but without revealing the whole data sequence? (such as a SSN can only the last 4 be released for verification instead of releasing the whole number string) if no go to step 116; if yes go to step 120—step 116—can this be internal data only? If yes go to step 118; if no go to step 300 the Secure file process—step 118—data cannot be released to outside processes and can only be accessed through internal network sources—step 120—Will the length be defined in the database or the appliance/server? If the appliance/server go to step 122; If the database go to step 130—step 122—Identify the proper length that can be released—step 124—set constant X(f)=maximum length allowed for (file f) for this secure information type—step 126—Define where and/or what bits to remove—Provide to Secure File Process 300—step 130—When the information is requested go to the proper database column that has the reduced length file within it—Provide to Secure File Process 300 and proceed to step 132—step 132—Are the other data files that need to be evaluated? If yes proceed to step 110; if no proceed to 136—step 136—End of process—step 150—Determine maximum length of time before file and directory permissions are to be sent (in other words if the permissions were not sent by this time send them) as well as for code database swap—step 152—Set constant S=Maximum length of time (in sec) for permissions to be sent; set constant T=times in sec for code database change—provide these to File Process Monitoring step 400—step 154—define what directories and files need monitoring—step 156—Define what actions will be needed to take place if certain violations take place—provide to Violations process 1200—step 170—Will/are latency issues be a problem? If yes go to step 172; if no go to step 174—step 172—Latency issues require a shift to using the timer for permission monitoring as opposed to attaching the permissions to every request. Define constant L=length of time (in sec) between sending the permissions. Send the result of step 170 to step 400 the File Monitoring process as well as the constant L and use Separation Process B—step 178—Append permissions to the requests, send this to step 400 the File Monitoring Process and use Separation Process A—step 180—Does the client want permissions coded or encrypted? for encrypted go to step 190; for coded go to step 182—step 182 does the client want to have a separate client appliance or have the client software run on the server itself? If separate client appliance go to step 184; if client software on the servers then go to step 1700 the client software running on the server process—step 184—Will multiple codes per item be used? If yes go to step 186; if no go to step 1300 the code generation process—step 186—define constants N=the number of extra codes required per item, send this information to step 1310 the Code Generation Process—step 190—define constants X and B; X=the number of data bits there will be for an item code, B=8x send these constants to step 600 the Encryption Process.

Figure 4:
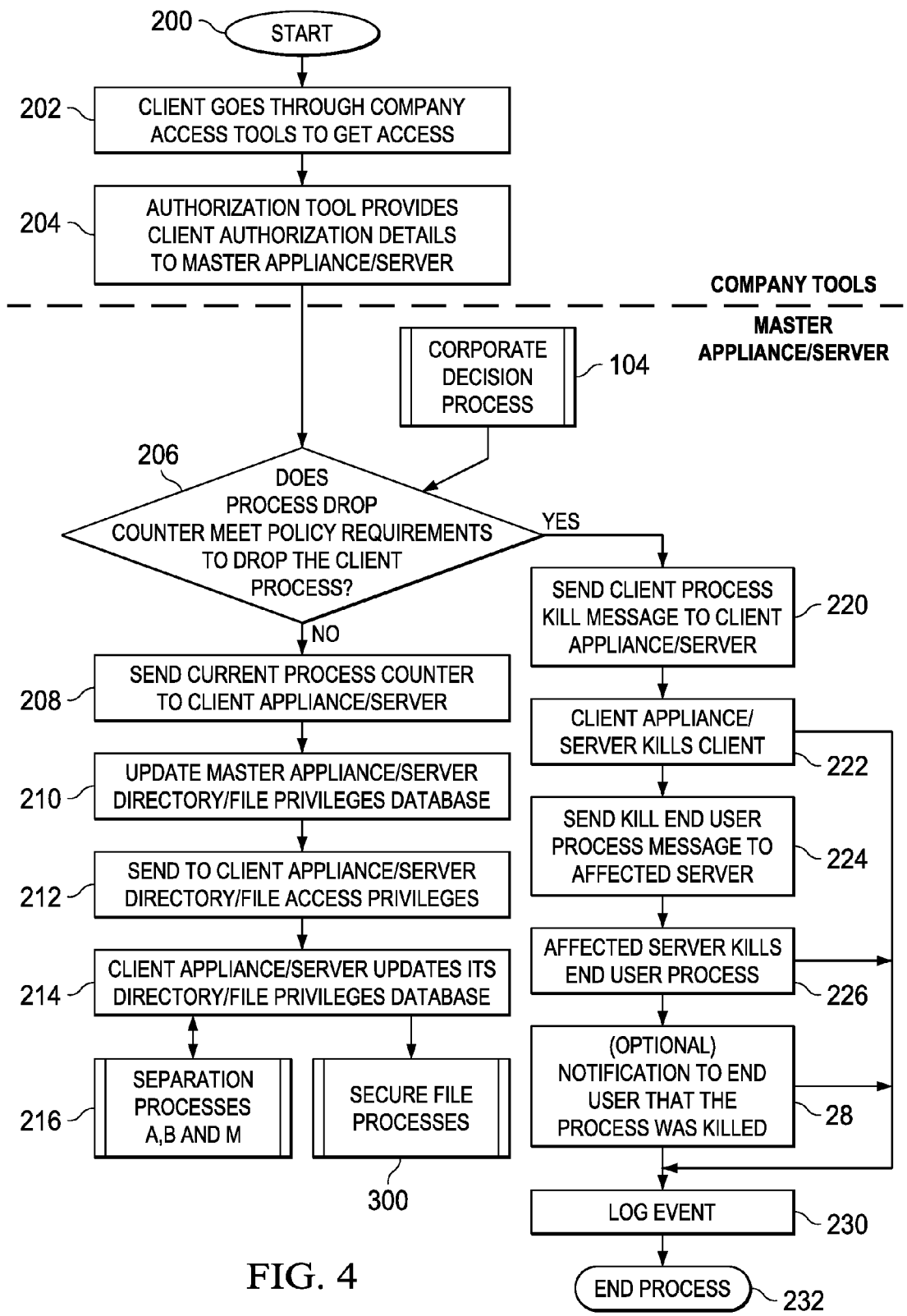
FIG. 4 is an Authorization Process 200—This diagram helps define the privileges database and starts the user "kill" process should it be required.

FIG. 4 is an Authorization Process—step 202—Client goes through company access tools to gain access—step 204—company authorization tools provide client authorization details to master appliance/server—step 206—does process drop counter meet policy requirements to drop client process? If yes go to step 220; if no go to step 208—step 208—send current process counter to client appliance/server—step 210—update master appliance/server directory/file privileges database—step 212—send to client appliance/server directory/file privileges database—step 214—client appliance/server updates its directory/file database—step 216—send information to Separation Processes A, B or M as required, also send information to Secure File Process step 302—step 220—send client process kill message to client appliance/server—step 222—Client appliance/server kills process sends kill message to affected server—step 224—client server kills process—step 226 (optional) client server notifies end user that they are disconnected—step 230 log event—step 232—end process.

Figure 5A:
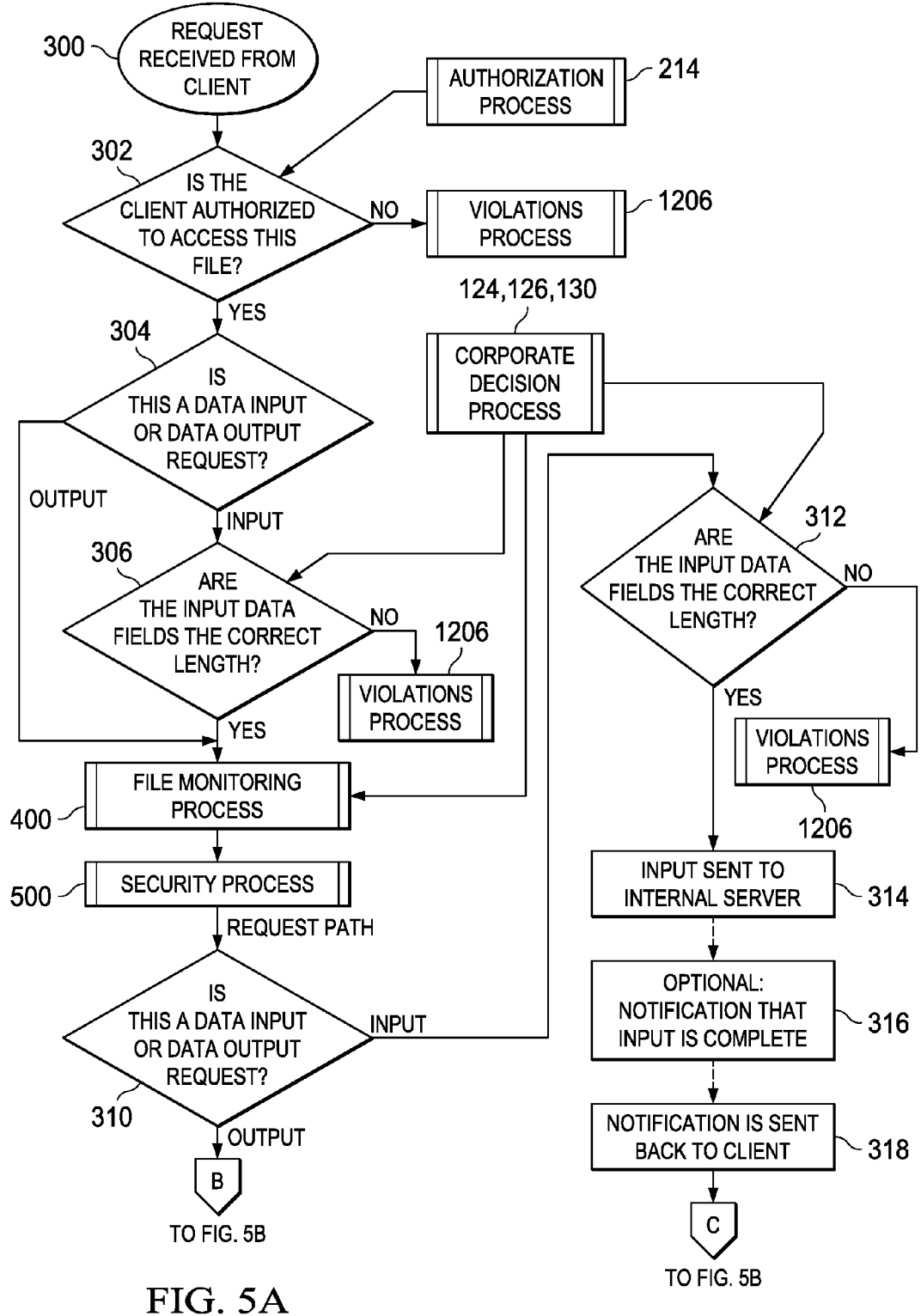
FIGS. 5A-5B are the Secure File Process 300—This diagram shows how a request flows through the system and the different decisions that are made along the way before data delivery.
Figure 5B:
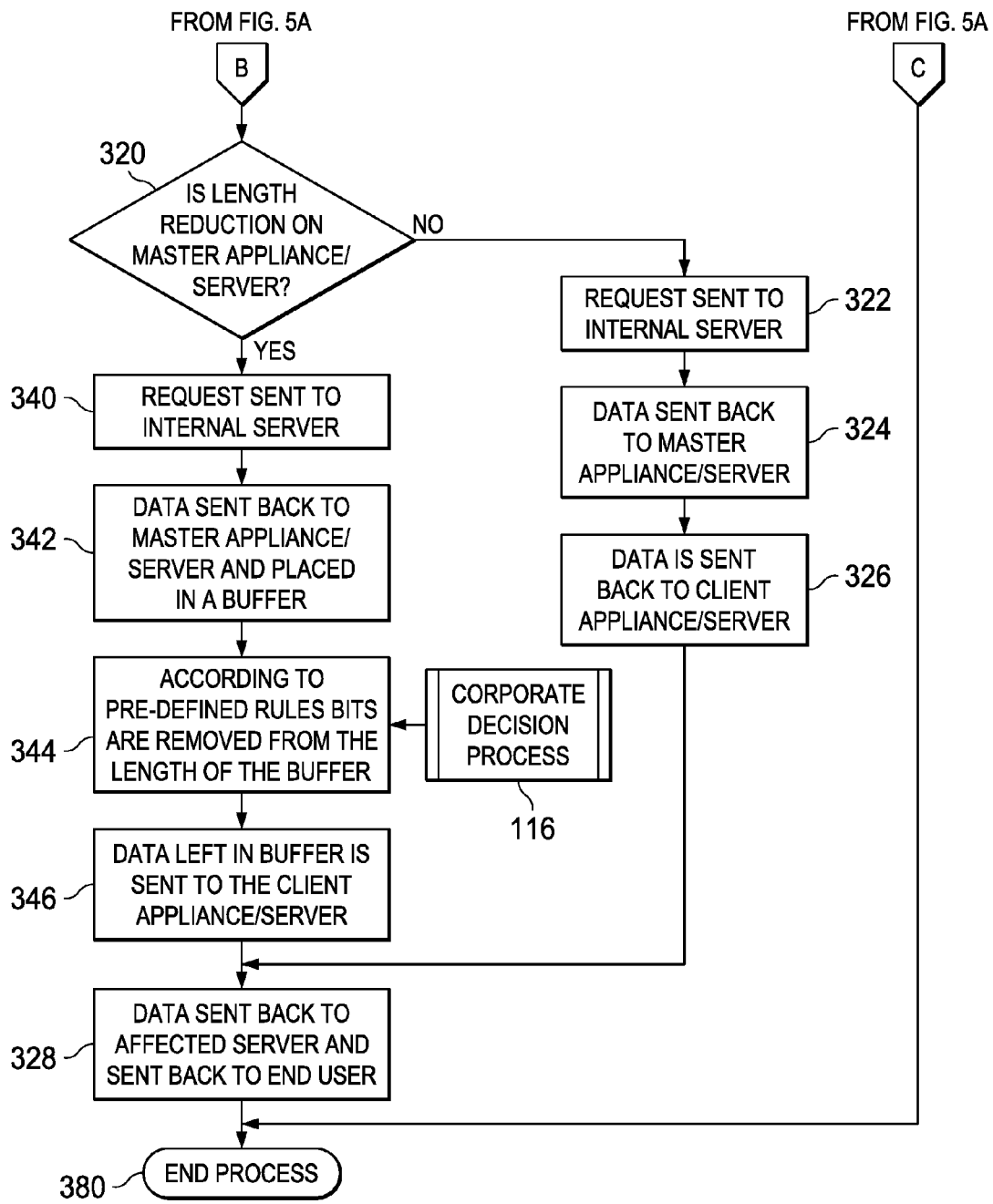

FIGS. 5A-5B are the Secure File Process—step 300—data request is sent to client appliance—step 302—is the client authorized to make the request for the file, if yes go to step 304; if no go to 1204 Violation Process—step 304—is this a data request or an input request? If input go to step 306; if input go to step 500 File Monitoring Process—step 306—are the input data fields the correct lengths? If yes go to step 400 File Monitoring Process; if no got to step 1206 Violations Process—Data is processed through the File Monitoring Process (400) and the Security Process (500) and then sent to step 310—step 310—is this a data input or data output request? If input, go to step 312; if output go to step 320—step 312 are the input data fields the correct length (from the Corporate Decision Process step 124)? If yes go to step 314 if no go to step 1206 Violations Process—step 314—Input sent to internal server—step 316 (optional) notification to client that input is complete sent to client appliance/server—step 318 (optional) notification to client that input is complete sent to affected server to end user—step 380—end process—step 320 is length reduction on the master appliance/server? Yes go to step 342; if no go to step 322—step 322—request sent to internal server—step 324—data sent back to master appliance/server from internal server—step 326—Data sent back to client appliance/server—step 328—data sent back to affected server then to the end user—step 380 end process—step 340 request sent to internal server—step 342 data is sent back to master appliance/server from the internal server and placed in a buffer—step 344—according to pre-defined rules (from Corporate Decision Process step 116) bits are removed from the length of the buffer—step 346—data left in the buffer is sent back to the client appliance/server—step 328—data sent back to affected server then to the end user—step 380 end process.

Figure 6:
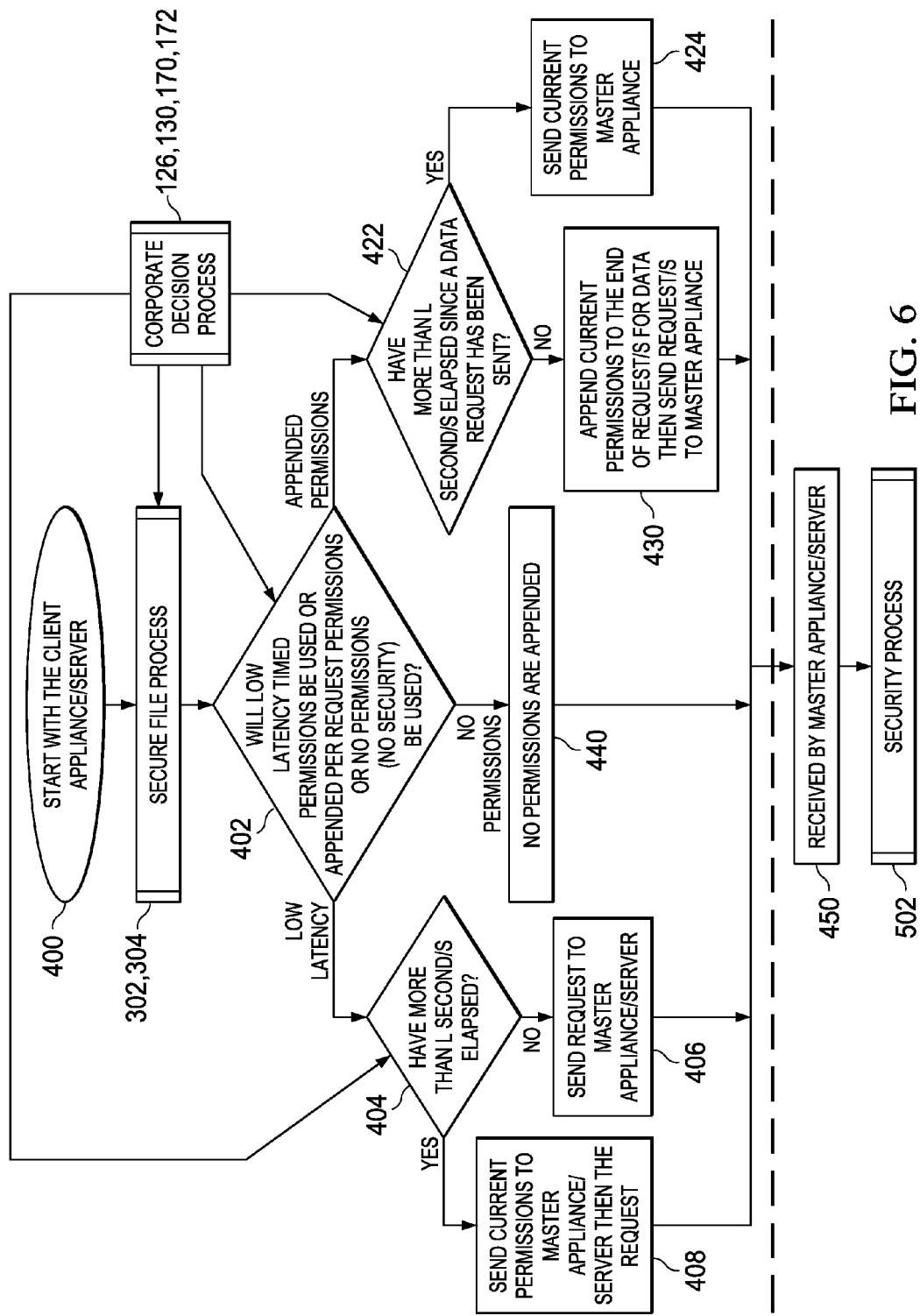
FIG. 6 is the File Monitoring Process 400—This diagram determines what direction the server permissions take. If there are latency issues or if latency is not an issue and more permission monitoring is required.

FIG. 6 is the File Monitoring Process—step 400—Data is received from Secure File Process 302 or 304—step 402—(from Corporate Decision Process step 170) will low latency timed permissions or appended permissions or no permissions (no security) be used? For low latency go to step 404; for appended permissions go to step 422; for no security (no permissions sent) go to step 440—step 404—has more than L seconds elapsed since a data request been sent? Yes go to step 408; no go to step 406—step 406—send request to master appliance/server—step 408 send current permissions to master appliance/server then send the request to the master appliance/server—step 422—has more than L seconds elapsed since a data request been sent? Yes go to step 424—send current permissions to master appliance/server; no go to step 430—step 430—append current permissions to the end of the request/s for data then send the request to the master appliance/server—step 440—No permissions are applied forward request to master appliance/server—step 450—request received by Master appliance/server—request is sent to step 502 the Security Process.

Figure 7:
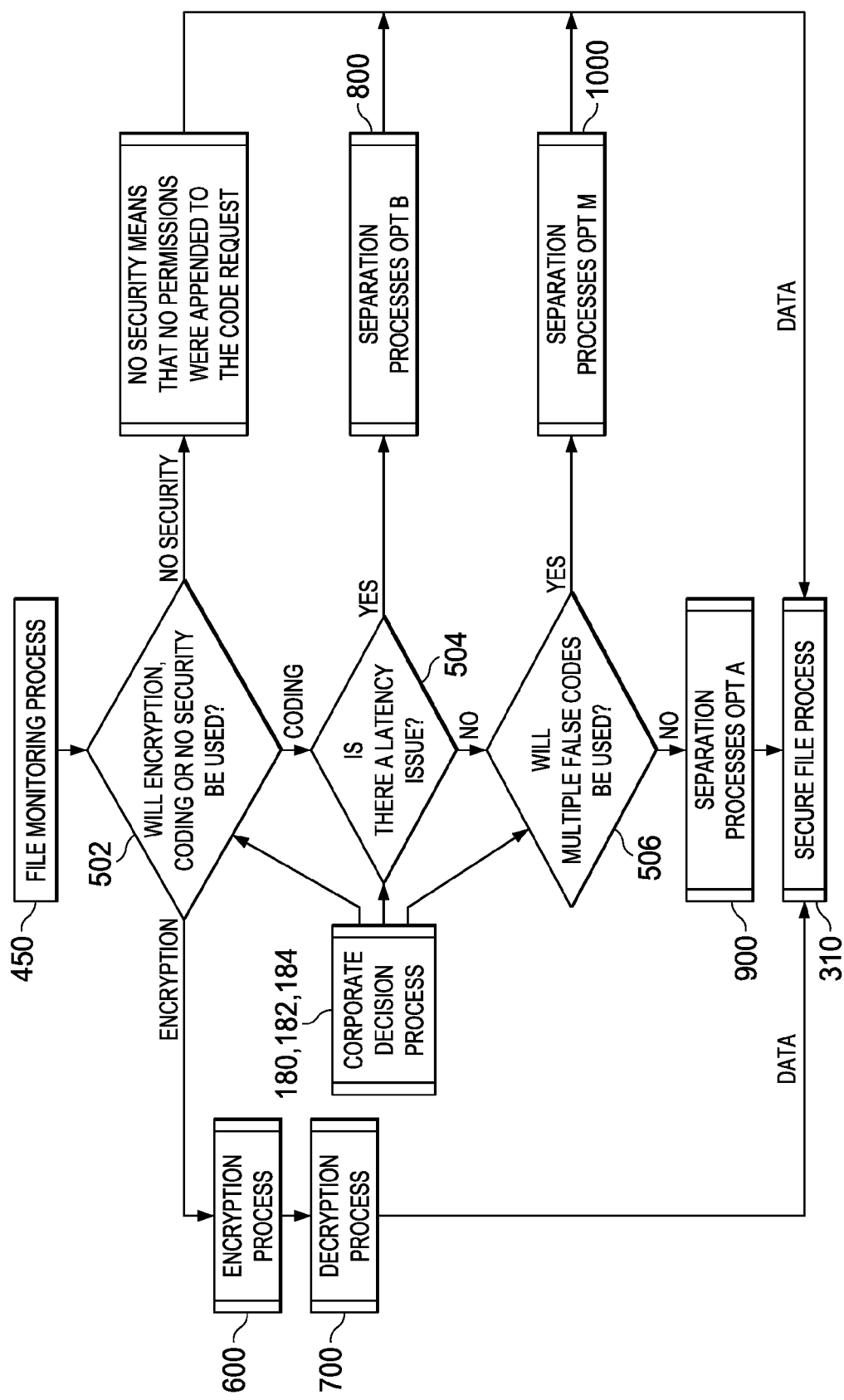
FIG. 7 is the Security Process 500—This diagram shows what flow the data and the permissions will take in order to separate them.

FIG. 7 is the Security Process 500—Data is received from step 450 from the File Monitoring Process—step 502—will encryption, coding or no security be used? If encryption go to encryption process 600; coding go to step 504; if no security (no processes sent) go to step 310 the Secure File process—step 504—will low latency timed permissions be used: if yes go to step 800 Separation Process B; if no go to step 506—step 506—will multiple false codes be used? If yes go to step 1000 Separation Process option M; if no go to step 900 Separation Process Option A.

Figure 8:
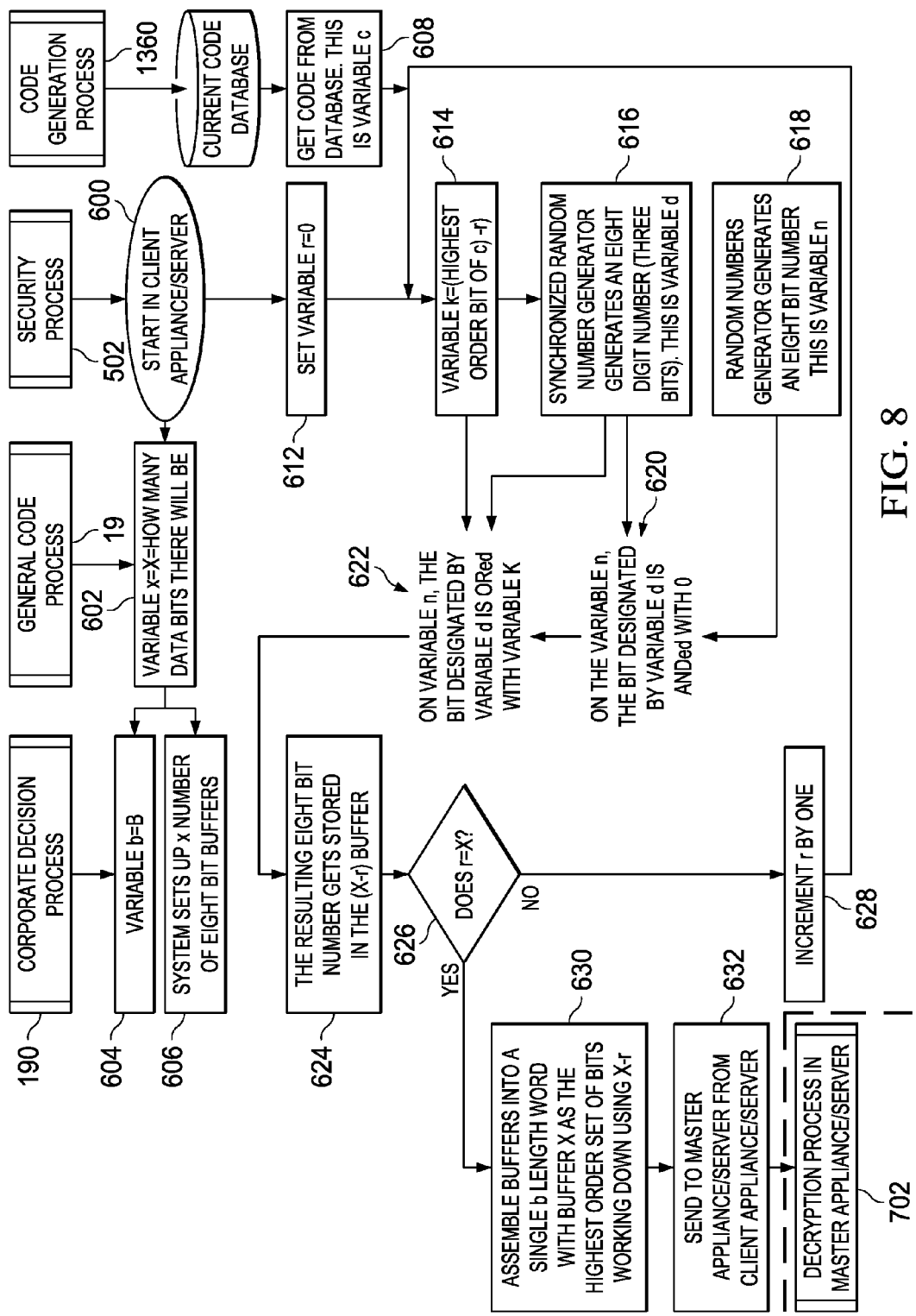
FIG. 8 is the Encryption Process 600—This diagram shows how encryption will take place and how we will hide a code in a larger digital number or word.

FIG. 8 is the Encryption Process 600—step 602 set variable x=X, this is the number of data bits there will be for an item—step 604—set variable b=B this is=to 8×—step 606—system generates X number of buffers of length X—step 608—get code from database make this=variable c—step 612—set variable r=0—step 614—variable k=the (highest order bit of variable c)—r, this is sent to step 622—step 616—synchronized random number generator generates an 8 digit digital number (3 bits) this is=to variable d, this is sent to step 620 and to step 622—step 618—Random number generator generates an 8 bit number this is=to variable n, this is sent to step 620—step 620—on variable n the bit designated by variable d is ORed (OR is a Boolean operation) with 0 the result is sent to step 622—step 622—on variable n the bit designated by variable d is ORed (OR is a Boolean operation) with variable k—step 624—the resulting 8 bit number gets stored in the (X-r) buffer—step 626—does r=X, if yes go to steps 612 and 630; if no go to step 628—step 628—increment r by 1—step 630—assemble the buffers into a single b length buffer with buffer X as the highest order set of bits working on down X-1, X-2 . . . —step 632—send to master appliance/server and to step 702 the De-encryption Process.

Figure 9:
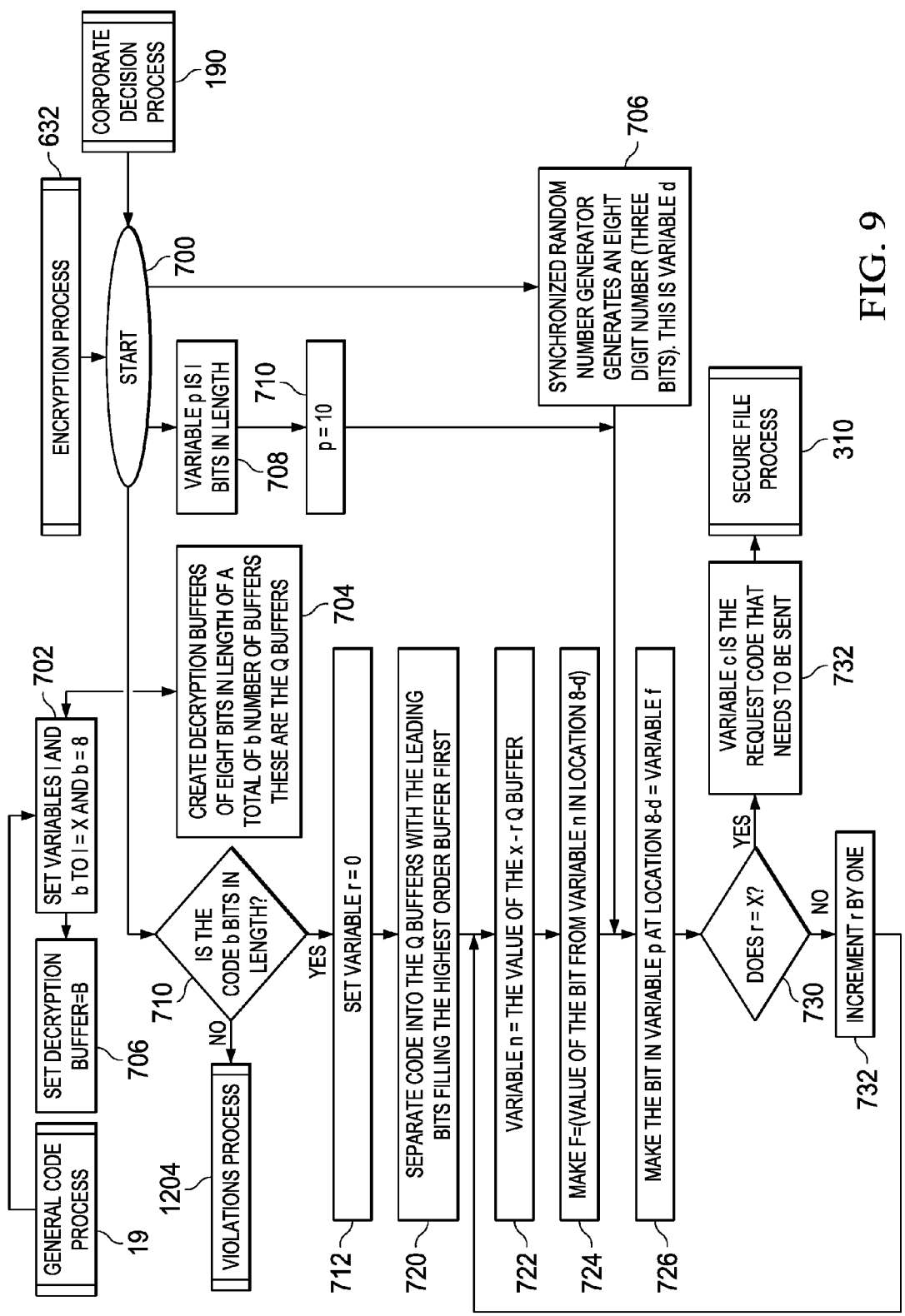
FIG. 9 is the Decryption Process 700—This diagram shows how we collect the valid code from the larger encrypted word.

FIG. 9 is the Decryption Process 700—step 702—set variables x and b; x=X and b=B (from Corporate Decision Process 190)—step 704—create decryption buffers of 8 bits in length for a total of b number of buffers these are known as the Q buffers—step 706—Synchronized random number generator generates an 8 digit number (3 bits in length) this is variable d—step 708—variable c=x bits in length—step 710—set variable c=0—step 710—is the code b bits in length; if no go to step 1204 the Violations Process; if yes go to step 712—step 712—set variable r=0—step 720—Separate code into x lengths of 8 bits each into the Q buffers with the highest order bits filling the highest order buffers—step 722—Variable n=the value of the (x-r) Q buffer—step 724—make variable f=the value of the bit in variable n designated in location 8—d step 726—place the value of f in variable c and locate it in bit position (x-r)—step 728—does r=x; if yes go to step 734; if no go to step 732—step 732—increment r by 1 go to step 722—step 734—variable c is the request code and needs to be sent to step 310 the Secure File Process.

Figure 10:
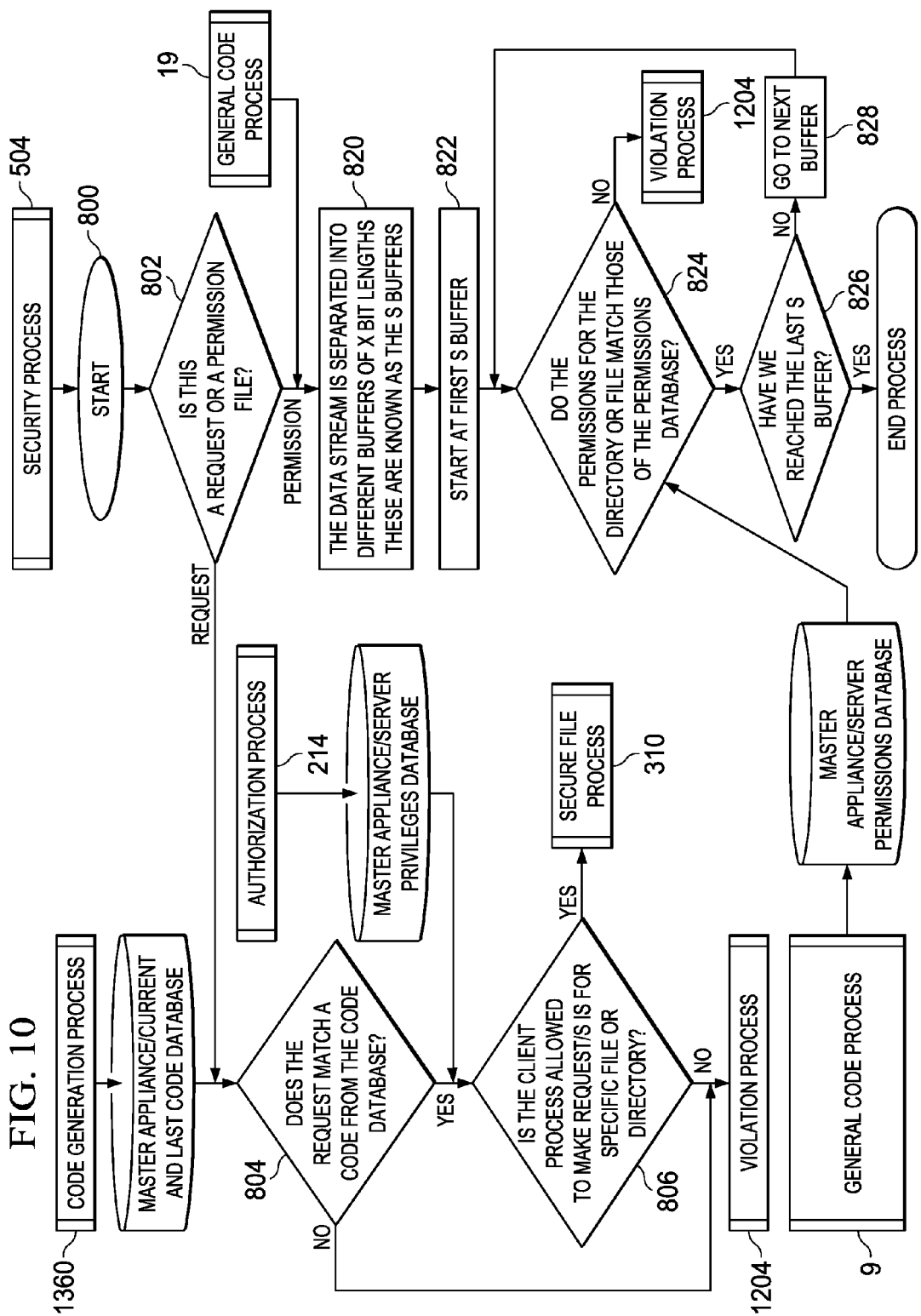
FIG. 10 is the Separation Process Option B 800—This diagram shows how a code is separated from a code request. This diagram is used when latency is a problem and directory and file permissions are sent on a specific period of time.

FIG. 10 is the Separation Process Option B 800—there are support mechanisms for this process that is fed from the Authorization Process from step 214 that goes to the master Appliance/Server Privileges Database and from the Code Generation process to the master Appliance/Server Current and Last Codes Database—data is received from step 504 of the Security Process—step 802—Is this a request or a permission file? If request go to step 804; if permission then go to step 820—step 804—does the request match a code from the code database, if yes go to step 806; if no got to step 1204 the Violations Process—step 806—is the client process allowed to make request for specific file or directory if yes go to step 310 the Secure File Process; if no go to step 1204 the Violation Process step 820—the data stream is separated into different buffers of X bit lengths, these are known as the S buffers—step 822—start at the 1st S buffer—step 824—do the permissions for the directory or the files match the permissions database? If yes go to step 826; if no go to step 1204 the Violations Process—step 826 have we reached the last S buffer? If yes go end the process; if no go to step 828—step 828 go to the next buffer then proceed to step 824.

Figure 11A:
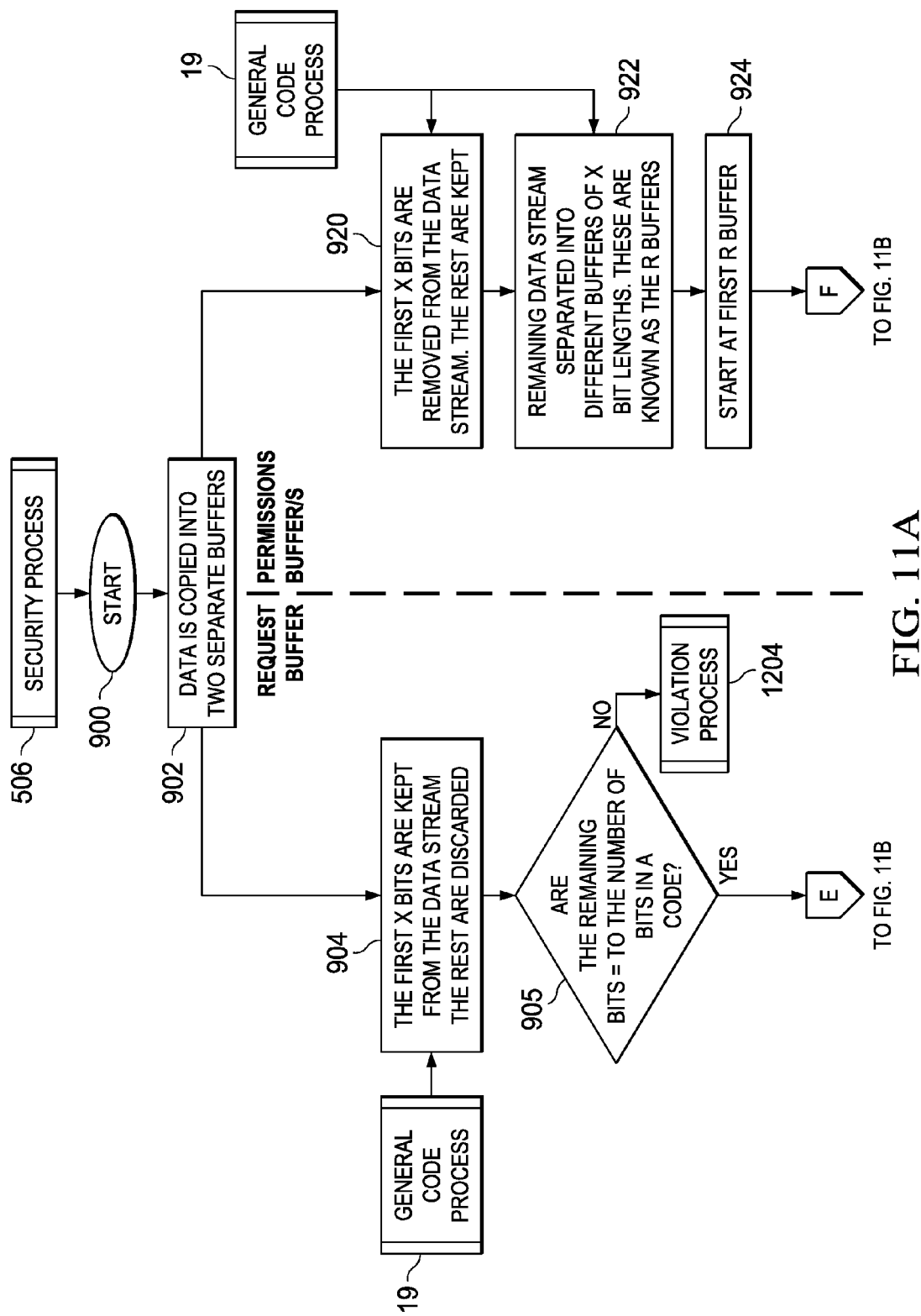
FIGS. 11A-11B are the Separation Process Option A 900—This diagram is used for a single code and can separate multiple file and directory permissions.
Figure 11B:
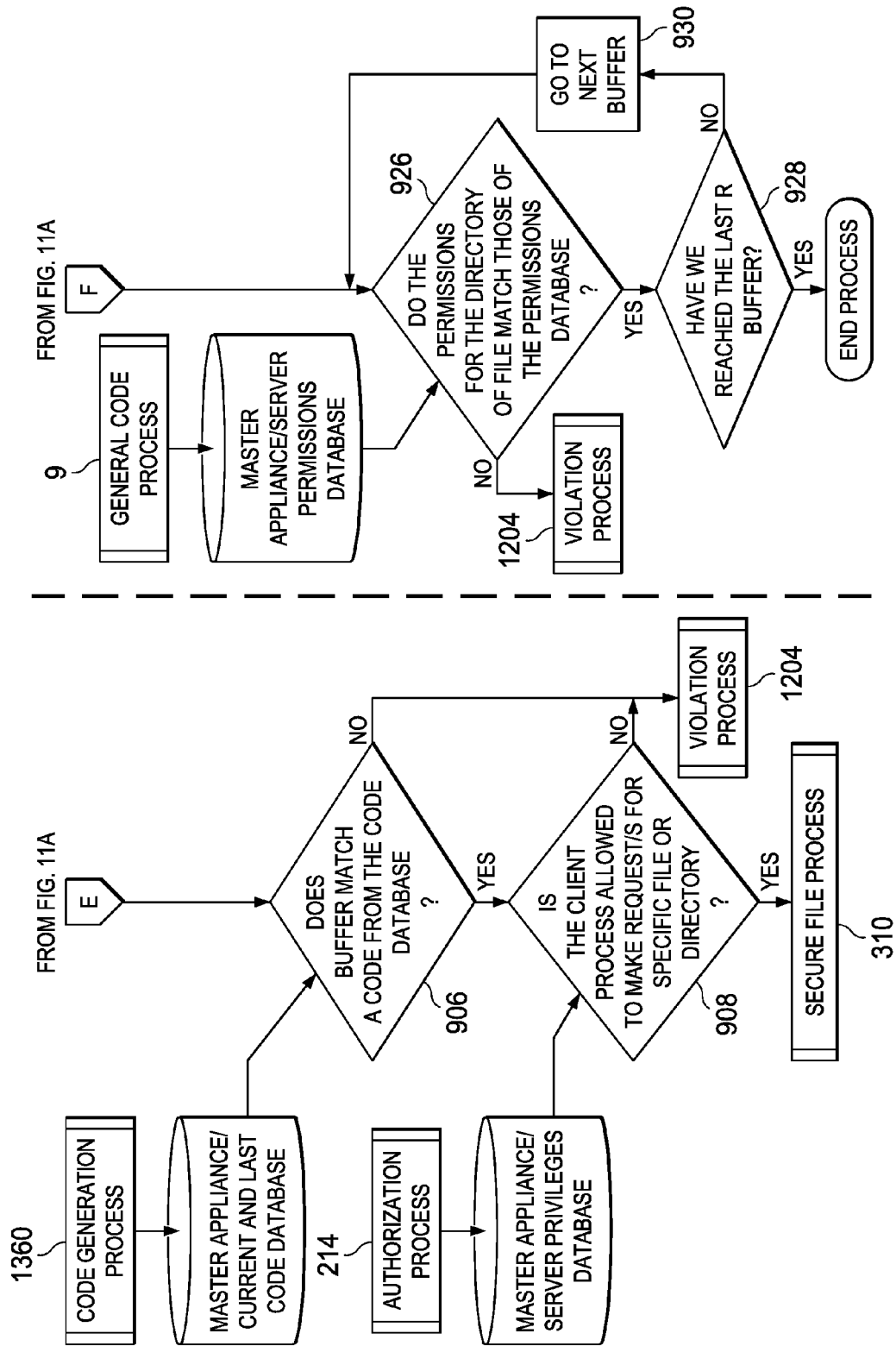

FIGS. 11A-11B are the Separation Process Option A 900—there are support mechanisms for this process that is fed from the Authorization Process from step 214 that goes to the master Appliance/Server Privileges Database and from the Code Generation process to the master Appliance/Server Current and Last Codes Database—data is received from step 506 of the Security Process—step 902—data is copied into 2 separate buffers and starts steps 904 and 920—step 904—the first X bits are kept from the data stream and the rest are discarded—step 905—Are the remaining bits equal to the number of bits that should be in a code? If yes go to step 906; if no go to step 1204 the Violation Process—step 906—Does the buffer match a code from the Current or Last Code databases? If yes go to step 310 the Secure File Process; if no go to step 1204 the Violations Process—step 920—the 1st X bits are removed from the data stream and the rest are kept—step 922—the remaining data stream is separated into different buffers of X bit lengths, these are known as he R buffers—step 924—start at the 1st R buffer—step 926—Do the permissions of the directory or the file match those of the permissions database? If yes go to step 928; if no go to step 1204 the Violations Process—step 928—have we reached the last R buffer? If yes this ends the process; if no go to step 930—step 930 go to the next buffer and proceed to step 926.

Figure 12A:
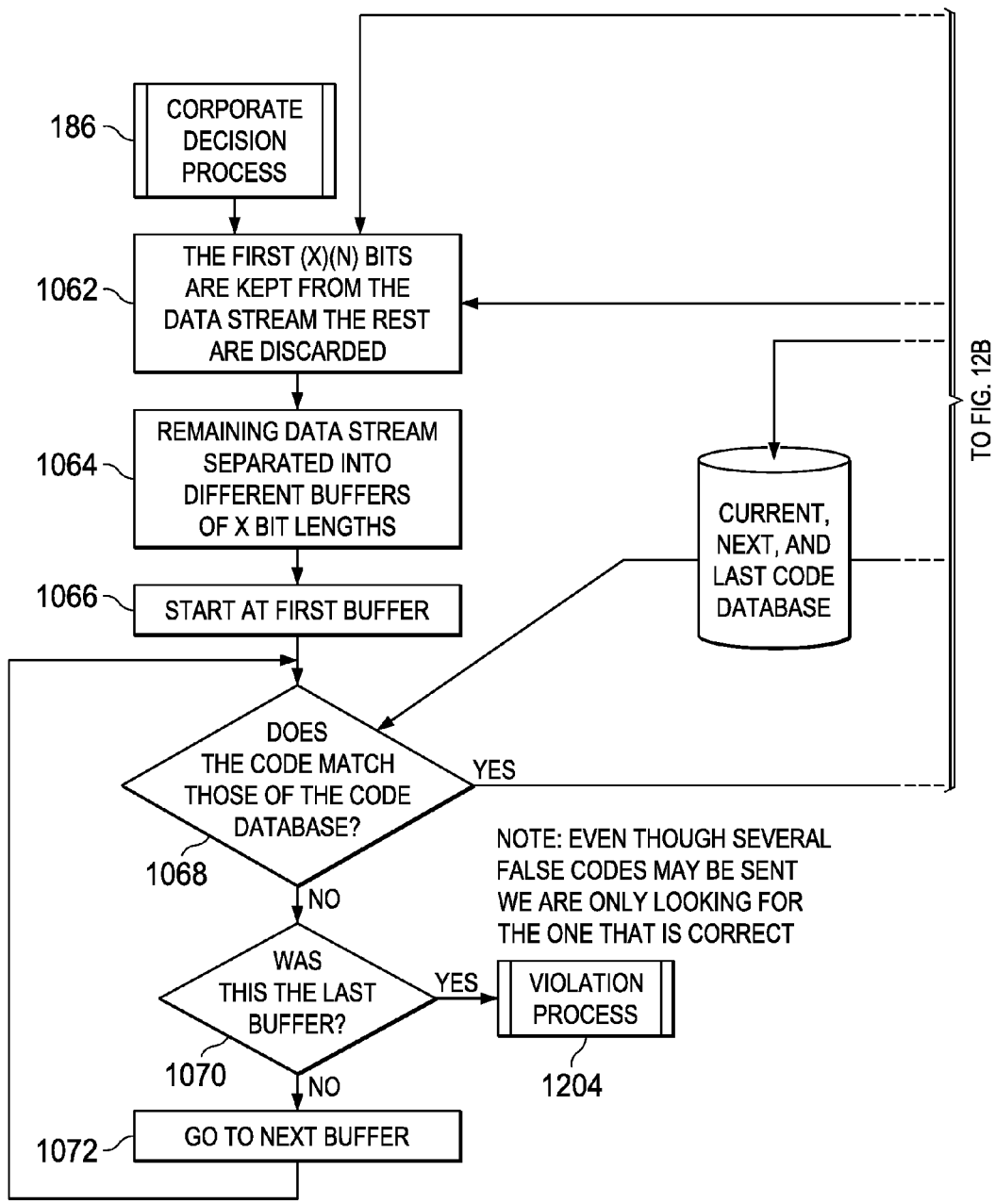
FIGS. 12A-12C are the Separation Process Option M 1000—This diagram is used when multiple codes are sent for a specific item in the database as well as when multiple directory and file permissions are sent.
Figure 12B:
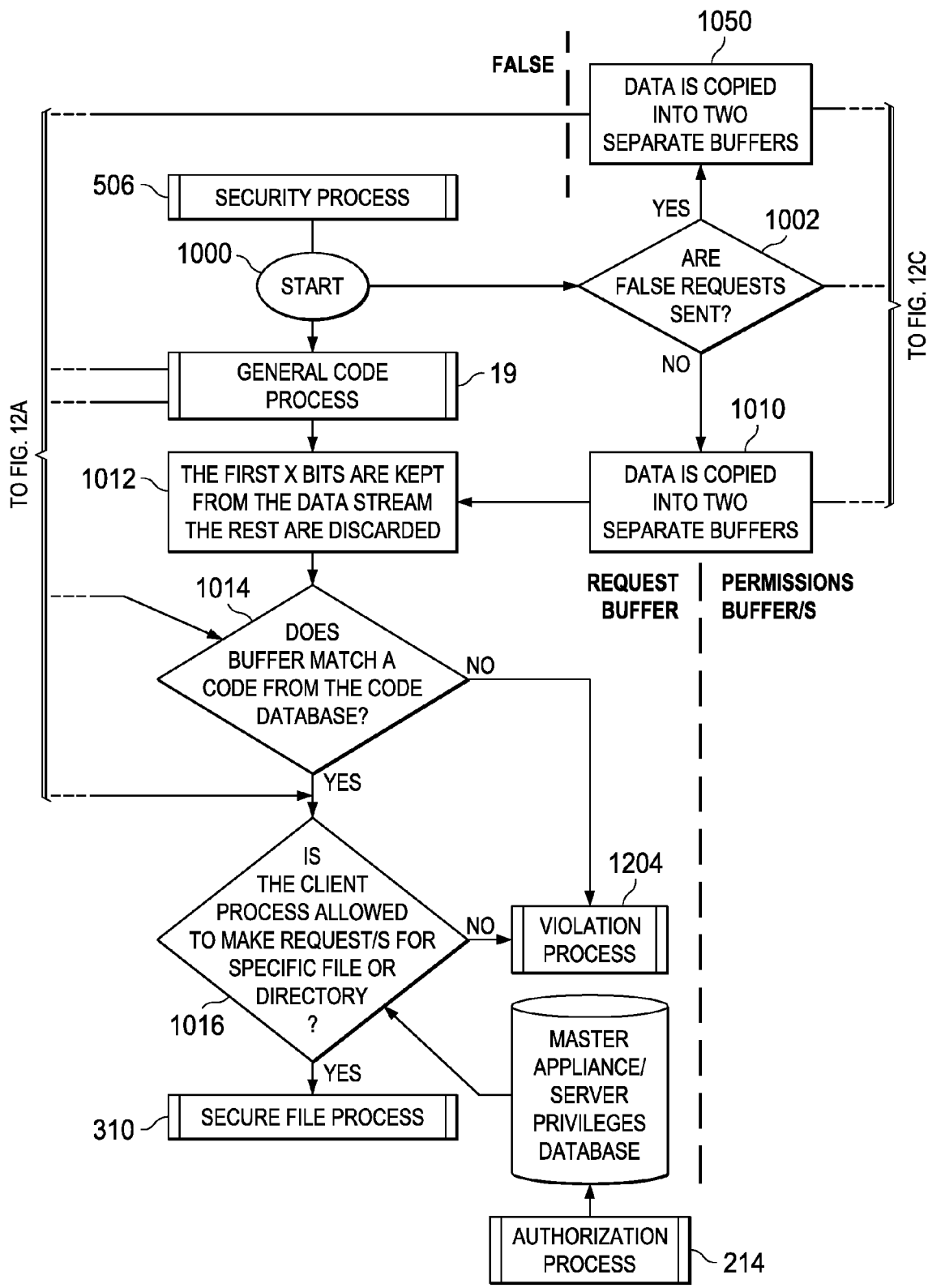
Figure 12C:
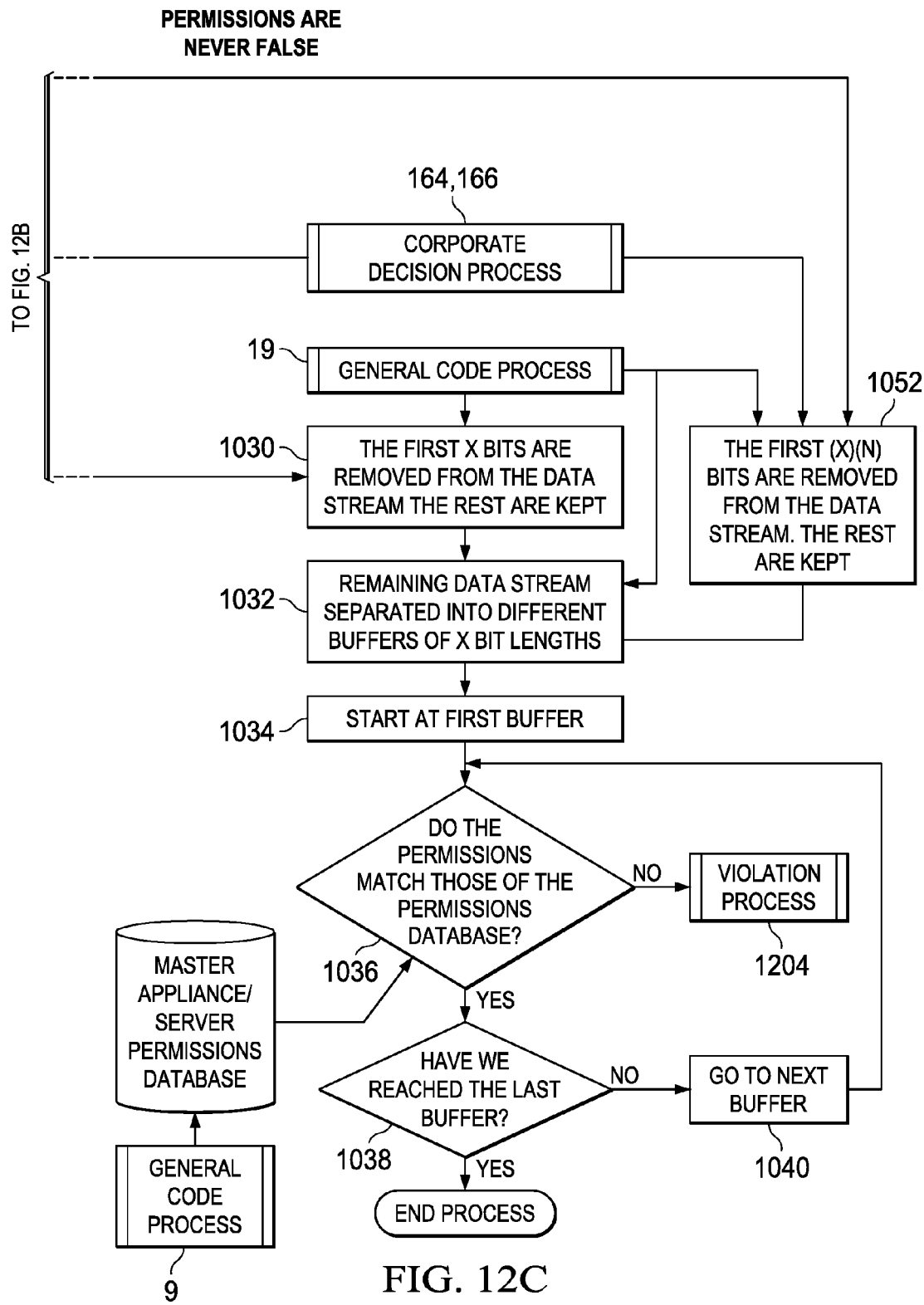

FIGS. 12A-12C are the Separation Process Option M 1000—there are support mechanisms for this process that are fed from the Authorization Process from step 214 that goes to the master Appliance/Server Privileges Database, from the Code Generation process to the master Appliance/Server Current and Last Codes Database and from the General Code Process steps 9 and 19—data is received from step 506 of the Security Process—step 1002—Are false requests sent if yes go to step 1050; if no go to step 1010—step 1010—data is copied into 2 separate buffers these go to steps 1012 and 1030—step 1012 the first X bits are kept from the data stream and the rest are discarded—step 1014—does the buffer match a code from the code database? If yes go to step 1016; if no go to step 1204 the Violations Process—step 1016 is the client process allowed to make a request for the specific file or directory? If yes go to step 310 the Secure File Process; if no go to step 1204 the Violation Process—step 1030 the 1st X bits are removed from the data stream and the rest of the data is kept—step 1032 the remaining data stream is separated into different buffers of X bits in length—step 1034—Start at the 1st buffer—step 1036—Do the permissions of the directory or file match those in the master appliance/server permissions database? If yes go to step 1038; if no go to step 1204 the Violations Process—step 1038—Have we reached the last buffer? If yes end of process; if no go to step 1040—step 1040—go to the next buffer and processed to step 1036—step 1050—Data is copied into 2 separate buffers going to steps 1062 and 1052—step 1052—the 1st (X)(N) bits are removed from the data stream and the rest are kept proceed to step 1036—step 1062—the 1st (X)(N) bits are kept from the data stream and the rest are removed—step 1064—the remaining data in the data stream are separated into different buffers of X bits in length—step 1066—start at the 1st buffer—step 1068—does the code in the buffer match those in the Current, Next or Last Database? If yes go to step 1016; if no go to step 1070—step 1070 was this the last buffer? If yes go to step 1204 the Violations Process; if no go to step 1072—step 1072—go to the next buffer and proceed to step 1068.

Figure 13A:
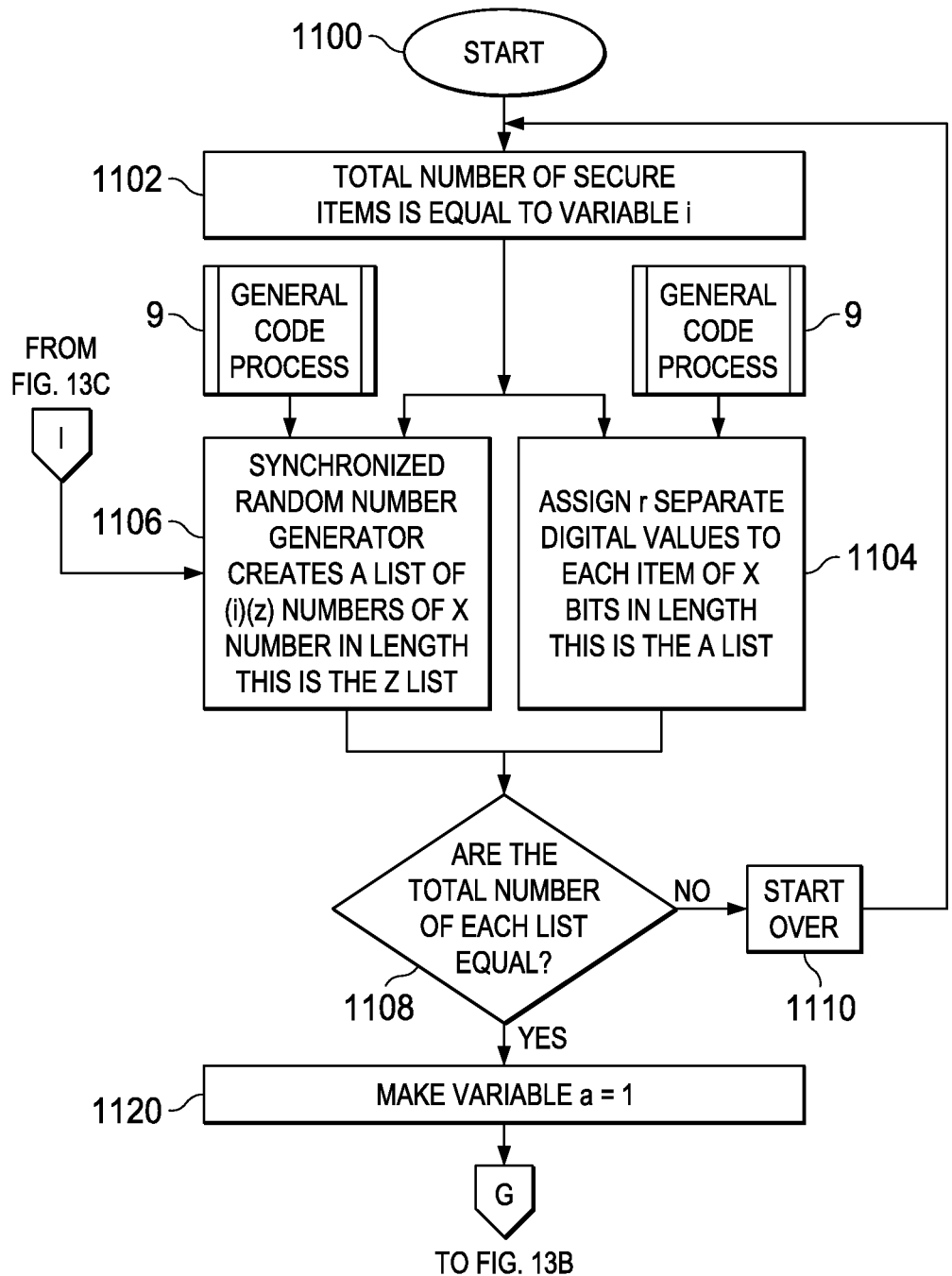
FIGS. 13A-13C are the Code Generation Process Option A 1100—This diagram follows the process where codes are generated.
Figure 13B:
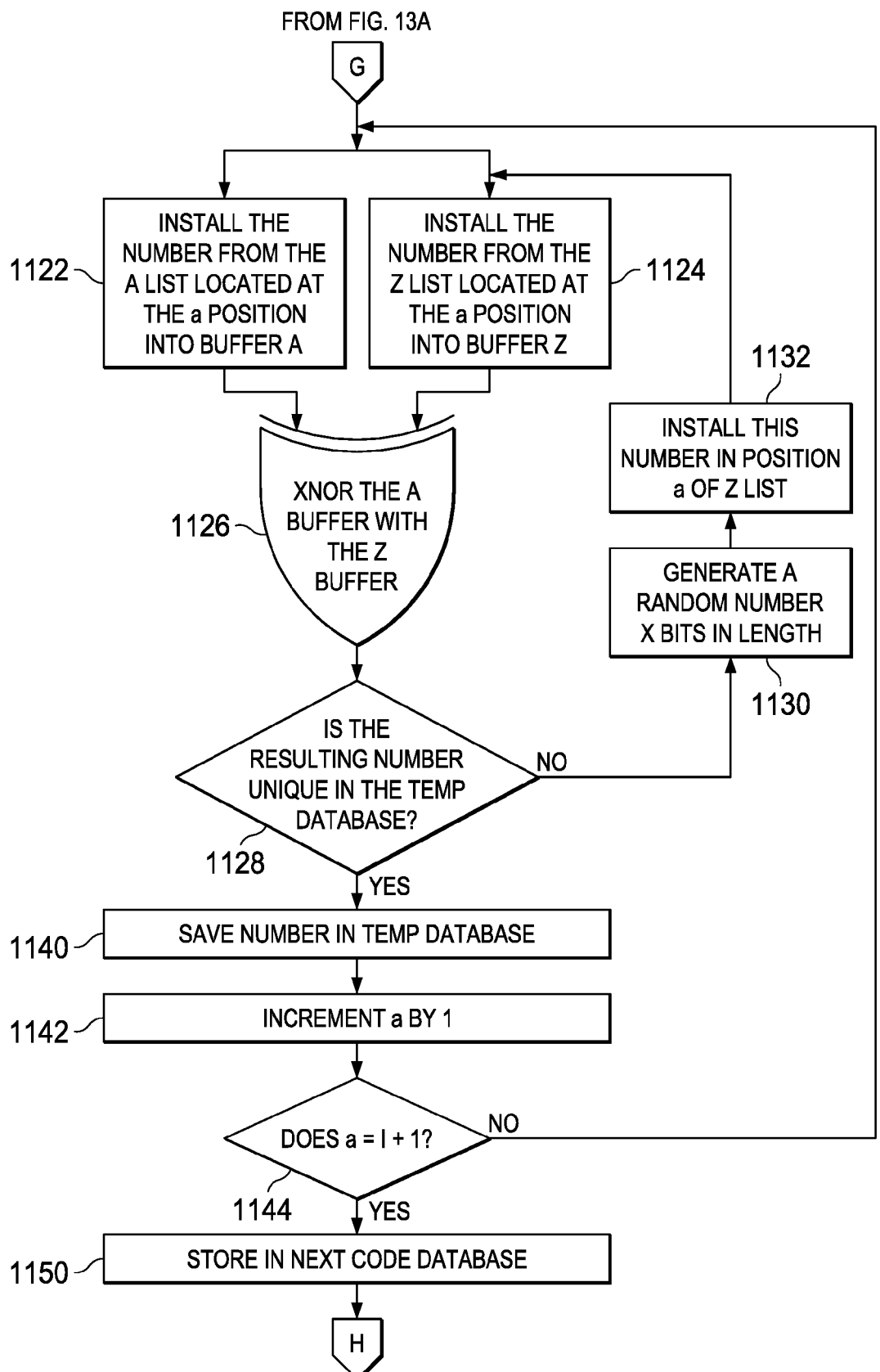
Figure 13C:
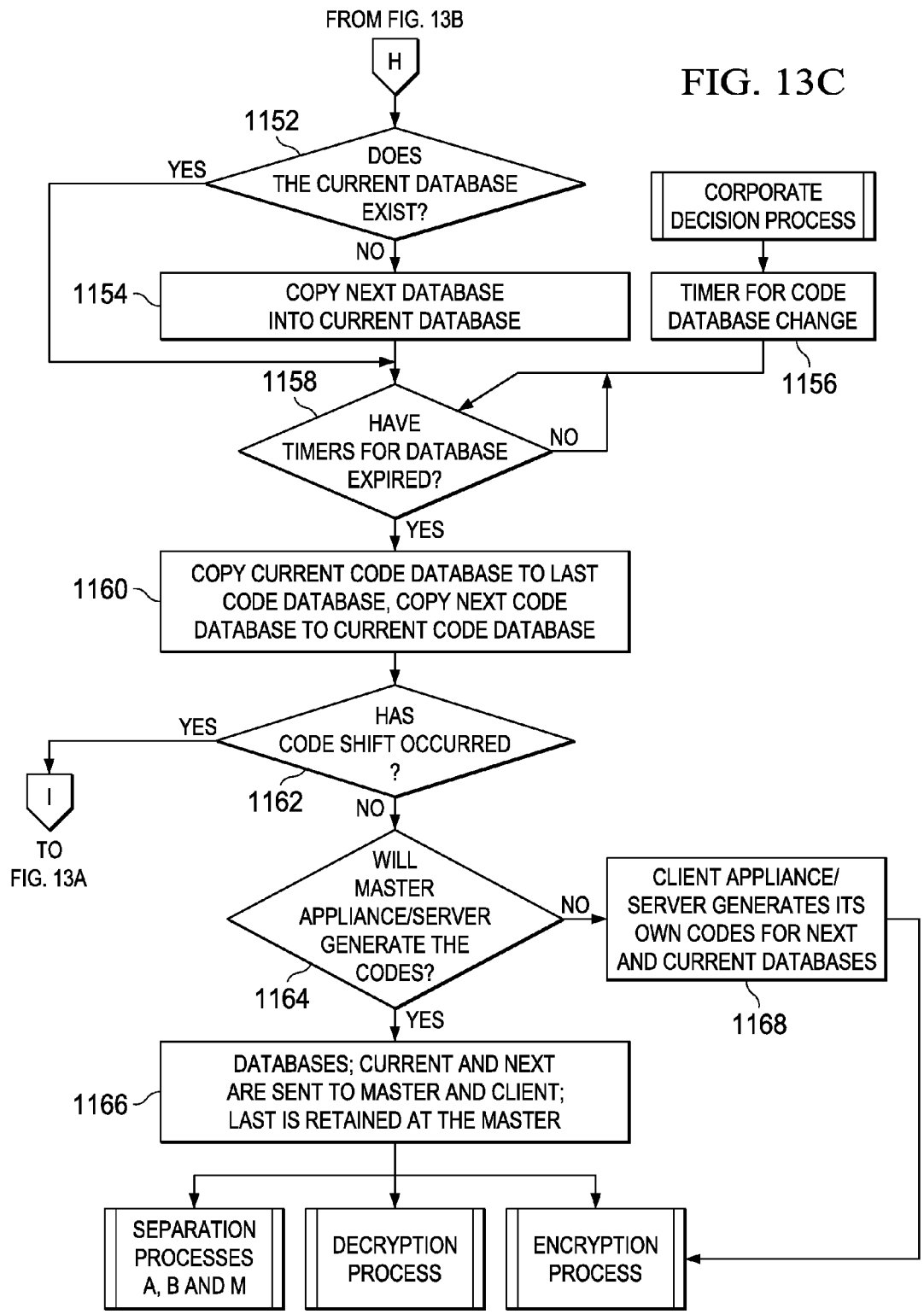

FIGS. 13A-13C are the Code Generation Process Option A 1100—step 1102—the total number of items in the secure database is equal to the variable i—step 1104—assign r separate digital values to each item equal to X bits in length, this is the A list—step 1106—A random number generator creates a list of (i)(z) numbers of X bits in length, this is the Z list—step 1108—Are the total numbers in each list equal? If yes go to step 1120; if no go to step 1110—step 1110—dump both lists and restart process by going to step 1102—step 1120—set variable a=1—step 1122—install the number from the A list at the a location into buffer A—step 1124—install the number from the Z list located at the a position into the Z buffer—step 1126—XNOR the random numbers from the A and Z buffers—step 1128—is the resulting number unique in the temporary database? If yes go to step 1140; if no go to step 1130—step 1130—generate a random number X bits in length—step 1132—install this number into position a of the Z list, go to step 1124—step 1140—save the number in the temporary database—step 1142—increment a by 1—step 1144—does a=(I+1) if yes go to step 1150; if no go to steps 1122 and 1124—step 1150—Store the temporary database into the NEXT database—step 1152—does the CURRRENT database exist? If yes go to step 1158; if no go to step 1154—step 1154—copy NEXT database in to the CURRENT database—step 1156—the timer is running and cycles according constant T sent from the Corporate Decision Process—step 1158—has the timer for the database change expired? If yes go to step 1160; if no check timer again—step 1160—copy Current Database into the LAST database, Copy the NEXT database into the CURRENT database—step 1162—has the code shift occurred? If yes go to step 1106 to restart coding process; if no go to step 1164—step 1164—will master appliance/server generate the codes? If yes go to step 1166; if no go to step 1168—step 1166—Databases CURRENT and NEXT are sent to Master and client appliances/servers; the LAST database is kept at the master appliance/server, the resulting databases are supplied to the Encryption, Decryption and Separation processes—step 1168—client appliance/server generates its own synchronized codes for NEXT and CURRENT databases the result is sent to the Encryption and General Code Process.

FIG. 14 is the Violations Process 1200—Several different processes send their issues to this process—all issues go through the 1st 2 steps in parallel—step 1202—log the event—step 1204—was the violation an access or input violation? If input go to step 1206; if access go to step 1212—step 1206—was the violation on the client or the master appliance/server? If client go to step 1208; if master go to step 1230—step 1208 (Optional) Notify client that the input field/s were filled in incorrectly then end process—step 1212—increment client process counter by 1—step 1214—does the client process counter meet policy to kill client's processes? If yes go to step 1216; if no go to step 1220—step 1216—send kill client process message to the client appliance/server—step 1218—client appliance/server kills client process send message to server to kill client process as well—step 1220—log event—step 1222—Drop the request then end the process—step 1230—reboot client appliance/server—step 1232—does violation meet policy to lockout client account? If yes go to step 1234; if no go to step 1236—step 1234—send client account lockout alarm to authorization tool and proceed to step 1222 after sending alarm/message to Company Security Alarm Processes and Policies—step 1236—Increment both client process counter and the client authorization counter by 1 proceed to step 1238 and to step 1240—step 1238—send incremented authorization counter to authorization database and to the master appliance/server step 1240—does authorization counter meet policy top lock client account? If yes go to step 134; if no go to step 1220.

Figure 15:
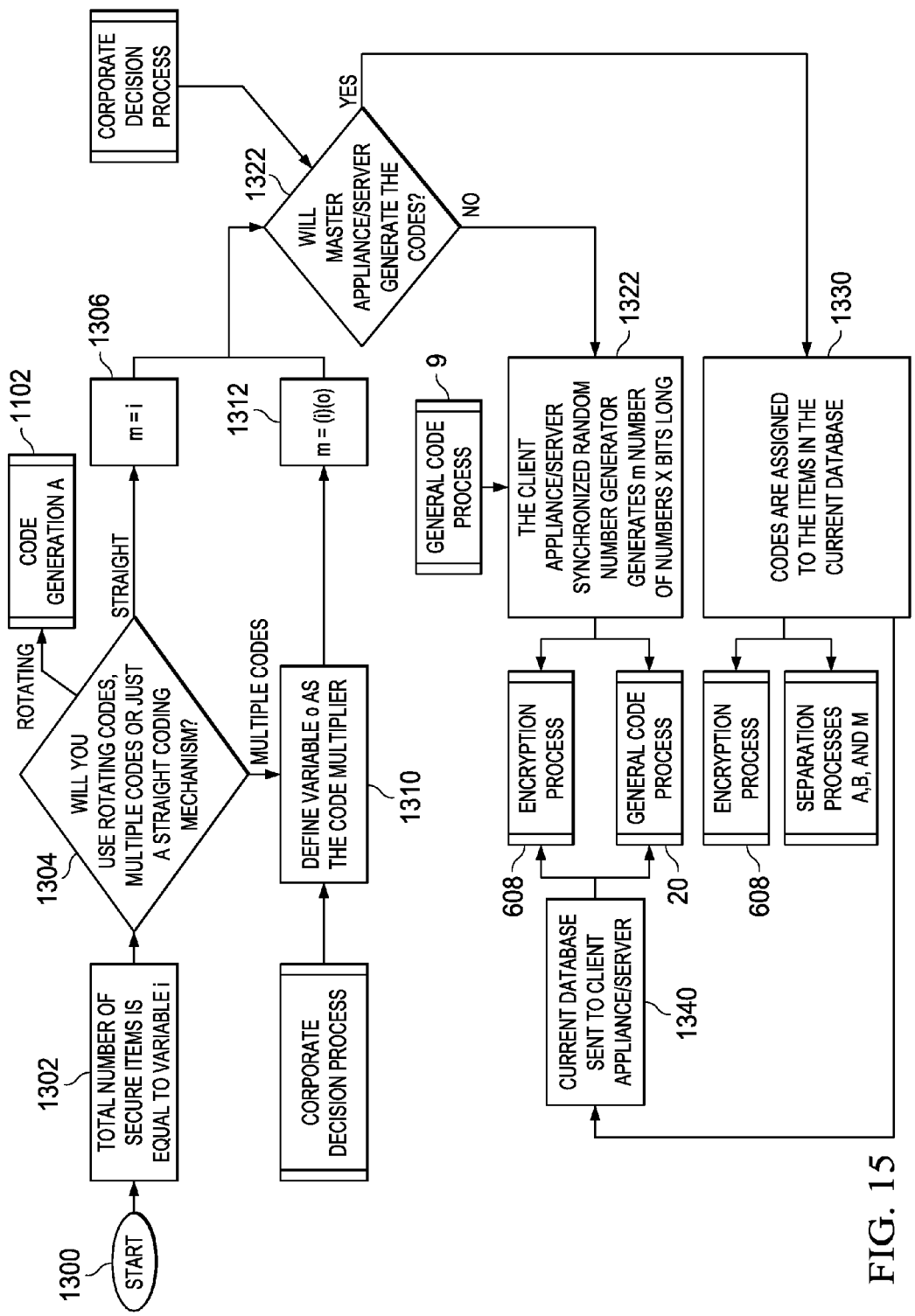
FIG. 15 is the Code Generation Process Option B Process 1300—This is another method that can be used to generate codes.

FIG. 15 is the Code Generation Process Option B Process 1300—step 1302—total number of secure items is equal to the variable i—step 1304—will you use rotating codes, multiple codes or just a straight coding mechanism if rotating code system go to the code generation process A step 1102; if multiple code system go to step 1310; if a straight code system go to step 1308—step 1308—make variable m=variable i—step 1310—define variable 0 as the code multiplier—step 1312—make variable m=variable i time variable o—step 1320—will the master appliance/server generate the code for the entire system? If yes go to step 1330; if no go to step 1322—step 1322—the client appliance/server generates it's own codes using a synchronized random number generator of X bits in length data is sent to step 20 of the General Code Process and to step 608 of the Encryption Process—step 1330—Codes are assigned to the items in the CURRENT database and are passed on to step 608 of the Encryption Process and to the Separation Processes A, B or M depending on what is used—step 1340—the CURRENT database is sent to the client appliance/server and then on to step 608 of the Encryption process and to the General Code Process.

Figure 16A:
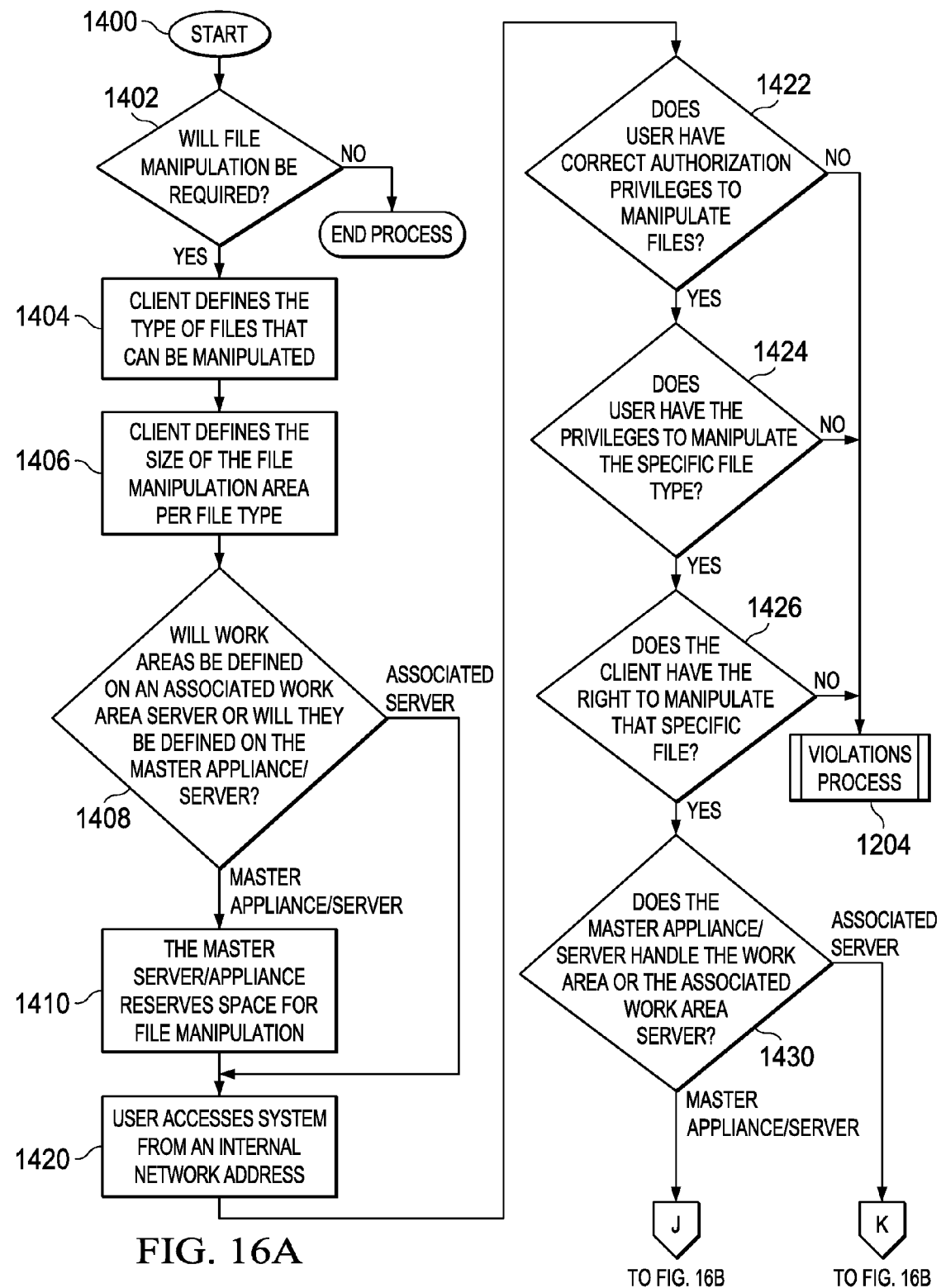
FIGS. 16A-16B are the File Manipulation Process 1400—This diagram is used when data needs to be worked on by the user him/her self.
Figure 16B:
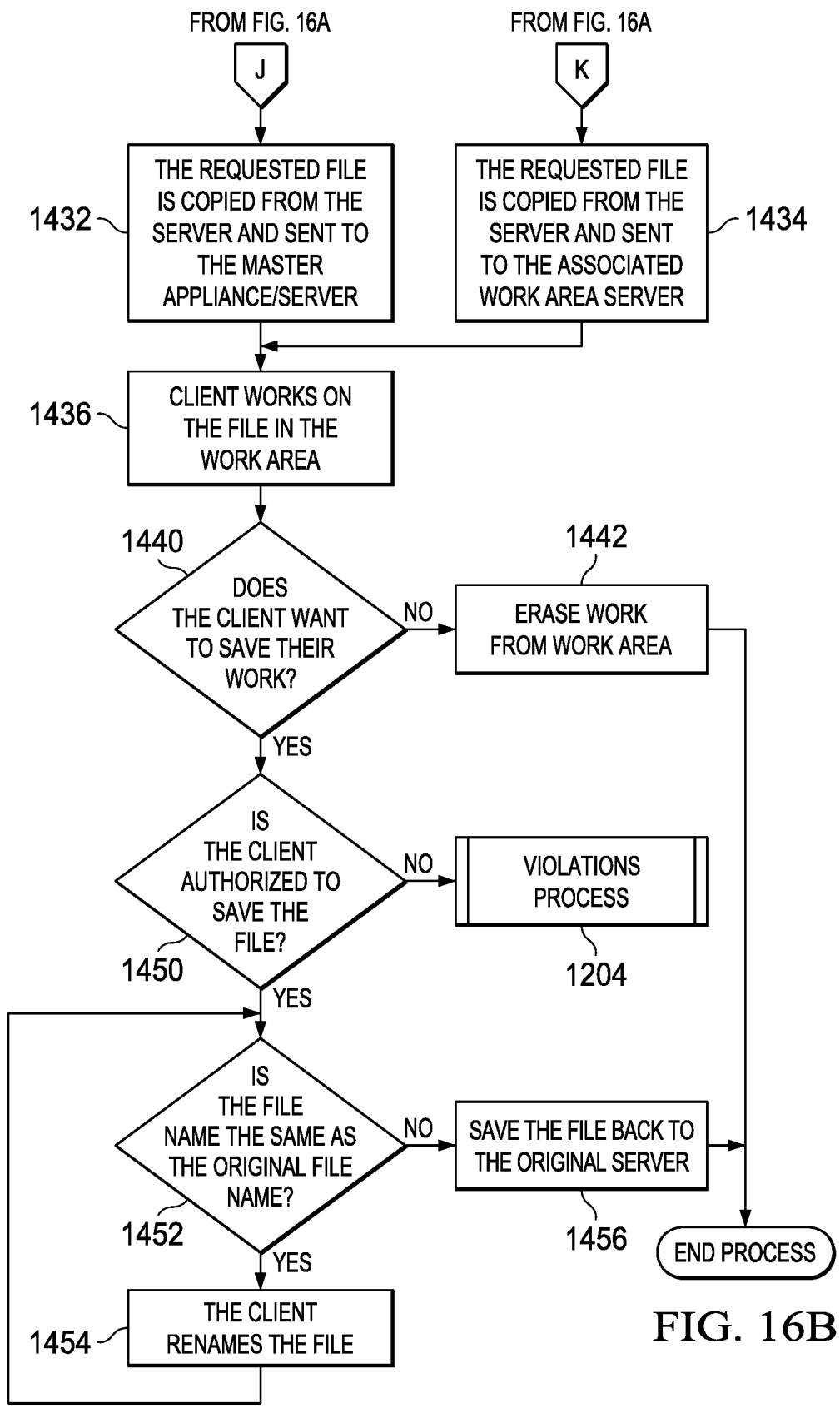

FIGS. 16A-16B are the File Manipulation Process 1400—step 1402—will file manipulation be required? If yes go to step 1404; if no end process—step 1404—client needs to define the type of files that can be manipulated—step 1406—the client defines the size of the manipulation area per file type—step 1408—will work areas be defined on an associated work area server or on the master appliance/server? If master appliance/server go to step 1410; if an associated server go to step 1420—step 1410 the master appliance/server reserves a minimum amount of space for file manipulation—step 1420—user accesses system from an internal network address—step 1422—does user have the correct privileges to manipulate files? If yes go to step 1424; if no go to step 1204 the Violations Process—step 1424—does the user have the privileges to manipulate the specific file type? If yes go to step 1426; if no go to step 1204 the Violations Process—step 1426—Does the client have the privileges to manipulate this specific file? If yes go to step 1430; if no go to step 1204 the Violations Process—step 1430—does the master appliance/server handle the work area or the associated work area server? If master appliance/server go to step 1423; if associated work area server go to step 1434—step 1432—the requested file is copied from the original server and sent to the work area of the master appliance/server—step 1434—the requested file is copied from the original server and sent to the work area of the associated work area server—step 1440—does the client want to save their work? If yes go to step 1450; if no go to step 1442—step 1442—erase work from the work area and end process—step 1450—does the client have the privileges to save work on the original server? If yes go step 1452; if no go to step 1204 the Violations Process—step 1452—if the file name the same as that of the original file name? if yes go to step 1454; if no go to step 1456—step 1454—have client rename file, proceed to step 1452—step 1456—save the file back to the original server, end process.

Figure 17:
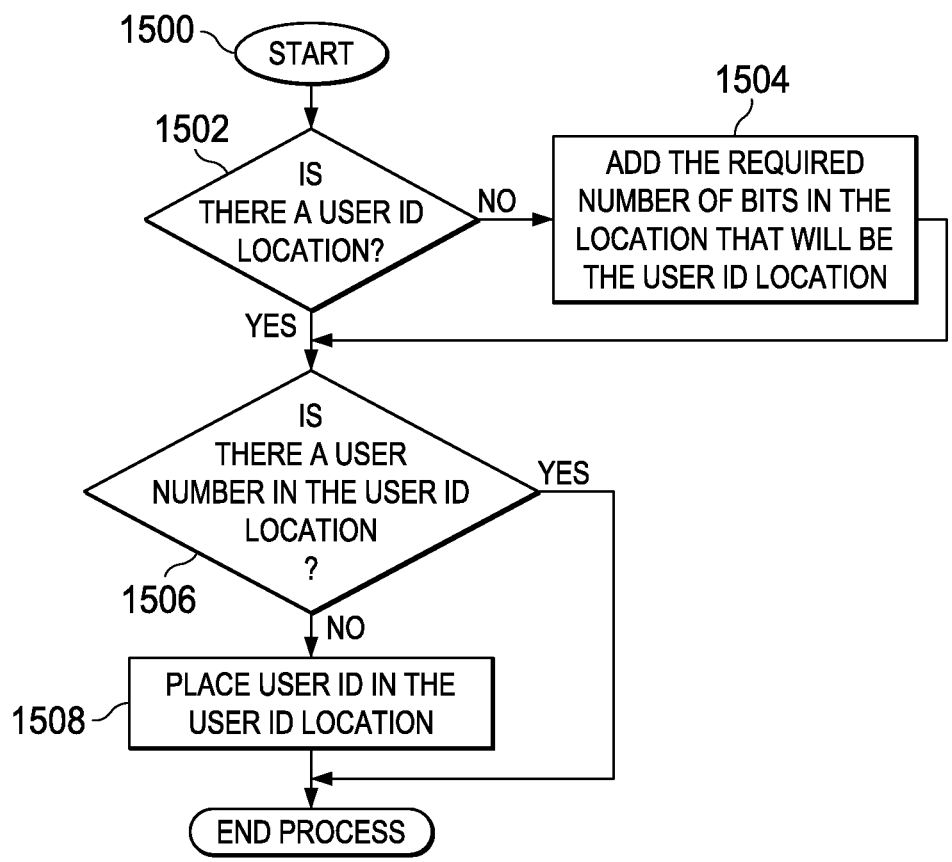
FIG. 17 is the File name Assignment Process A 1500—This diagram is how a file that is released to a user carries with it the designator of the person who requested it. This way a file can be tracked to the user who removed it from the system.

FIG. 17 is the File name Assignment Process A 1500—step 1502—is there a user ID location? If yes go to step 1506; if no go to step 1504—step 1504—add the required number of bits in the location that will be the user ID location (this will increase the size of the header)—step 1506—is there a user number in the user ID section? If no go to step 1508; if no then end of process—step 1508—place the user ID in the user ID location the go to end of process.

Figure 18:
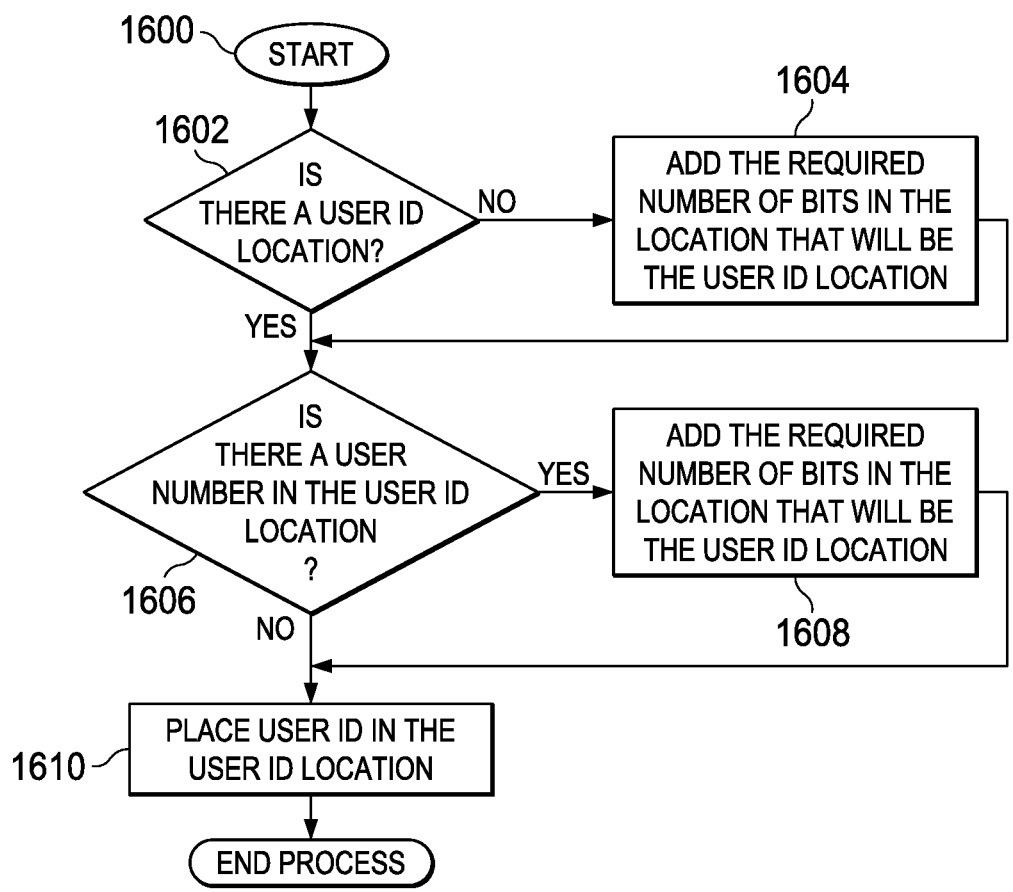
FIG. 18 is the File Name Assignment Process B 1600—This diagram shows how a file collects the names of the users who request it. In this way files can be tracked not just to who removed them from the system the first time but to who also accessed the files.

FIG. 18 is the File Name Assignment Process B 1600—step 1602—is there a user ID location? If yes go to step 1606; if no go to step 1604—add the required number of bits in the location that will be the user ID location (this will increase the size of the header)—step 1606—is there a user number in the user ID section? If yes go to step 1608; if no then go to step 1608—add the required number of bits in the location that will be the user ID location (this will increase the size of the header)—step 1610—place the user ID in the user ID location go to end of process.

Figure 19:
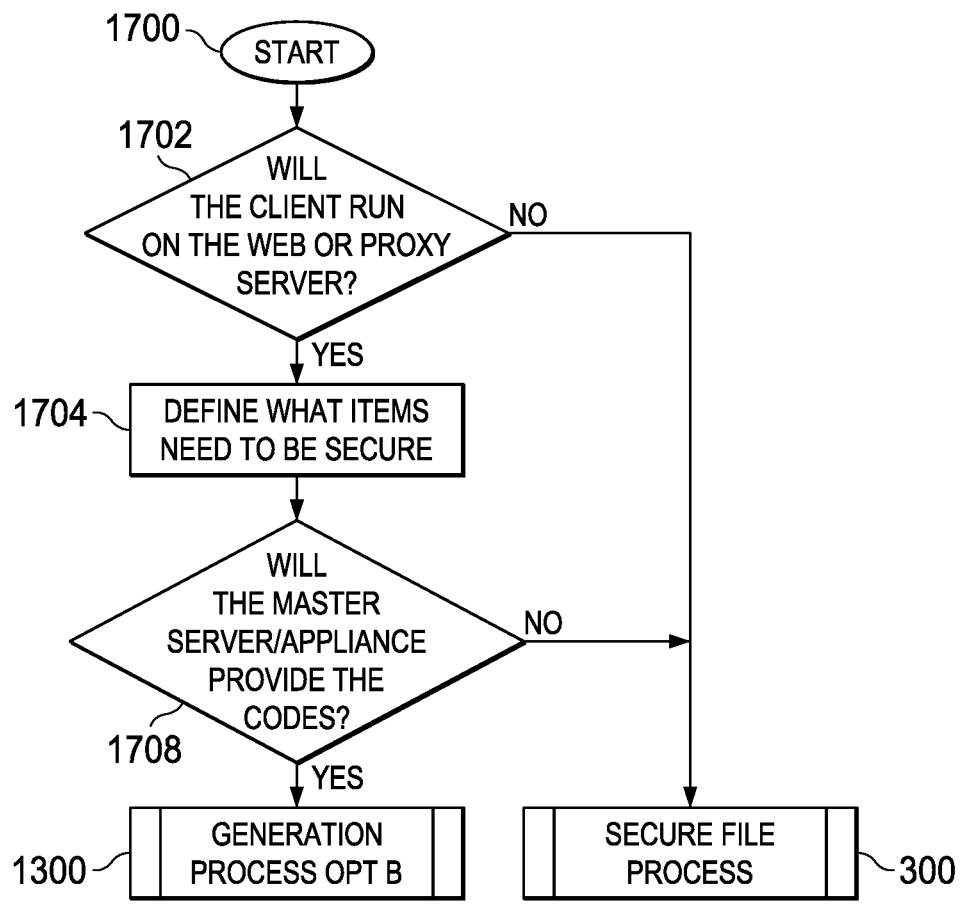
FIG. 19 is the Client Software on Server Process—This is used when running the software directly on the proxy or web server.

FIG. 19 is the Client Software on Server Process 1700—step 1702—Will the client software run on the Proxy or web server? If yes go to step 1704; if no go to the Secure Files Process 300—step 1704—Define what items need to be secure—step 1708—will the master appliance/server provide the codes? If yes go to the Code Generation Process 1300; if no go to the Secure File Process 300.

What is claimed is:

1. A system, comprising:
 a firewall;
 a first server computer located behind the firewall, the first server computer storing a first copy of a code database;
 a secure data system located behind the firewall; and
 a second server computer located before the firewall, the second server computer storing a second copy of the code database; and
 wherein the second server computer is configured to:
  receive a data request for data stored in the secure data system;
  convert the data request into a coded request based on an item code selected from the second copy of the code database, wherein the item code corresponds to a particular item in the secure data system; and
  transmit the coded request to the first server computer; and
 wherein the first server computer is configured to:
  receive the coded request from the second server computer;
  identify the item code from the coded request;
  determine whether the item code corresponds to one of a plurality of codes in the first copy of the code database;
  responsive to determining that the item code does not correspond to any codes in the first copy of the code database, cause the second server computer to terminate the data request; and
  responsive to determining that the item code corresponds to at least one of the codes in the first copy of the code database, retrieve the requested data from the secure data system and send the data to the second server computer.

2. The system of claim 1, wherein said first and second copies of the code database are automatically modified according to a predetermined schedule and communicated to the first and second server computers.

3. The system of claim 2, further comprising a knowledge database for indicating to the first server computer where to send the request based on the item code.

4. The system of claim 3, further comprising a database having rules for scoring and ranking requests for data so that a weight can be placed upon the respective requests t until a final threshold is reached and all further requests are rejected until allowed by a systems administrator.

5. The system of claim 2, further comprising a database having rules to apportion specific parts of a data steam to include the item code and a permissions authority according to a user permission level.

6. The system of claim 2, wherein said knowledge database further comprises rules for resolving false item codes.

7. The system of claim 1, wherein the first server computer is configured to monitor processes performed by the second server computer.

8. The system of claim 1, wherein the first server computer is configured to parse a communication received from the second server computer and extract the item code from the communication.

9. The system of claim 1, wherein a communication from the second server computer to the first server computer including the item code comprises a data stream having a number of bits, and wherein the first server computer is configured to discard a portion of the number of bits and use a remaining portion of the number of bits as the item code.

10. The system of claim 1, wherein the first server computer is configured to generate the first and second copies of the code database and send the second copy of the code database to the second server computer.

11. A method, comprising:
receiving, at a proxy server, a data request for data stored in a secure data system;
forwarding the data request to a first appliance;
converting, by the first appliance, the data request into a coded request based on an item code selected from a first copy of a code database maintained by the first appliance, wherein the item code corresponds to a particular item in the secure data system;
forwarding the coded request through a firewall to a second appliance;
identifying, by the second appliance, the item code from the coded request;
determining, by the second appliance, whether the item code corresponds to one of a plurality of codes in a second copy of the code database maintained by the second appliance;
responsive to determining, by the second appliance, that the item code does not correspond to any codes in the second copy of the code database, causing the first appliance to terminate the data request; and
responsive to determining, by the second appliance, that the item code corresponds to at least one of the codes in the second copy of the code database, retrieving the requested data from the secure data system and providing the data to the first appliance.

12. The method of claim 11, further comprising parsing, by the second appliance, a communication received from the first appliance to extract the item code from the communication.

13. The method of claim 11, further comprising determining, by the second appliance, where to send the request based on the item code.

14. The method of claim 11, further comprising:
automatically modifying the first and second copies of the code database according to a predetermined schedule.

15. The method of claim 11, further comprising monitoring, by the second appliance, processes of the first appliance.

16. The method of claim 15, further comprising, responsive to determining by the second appliance that the first appliance is subject to an unauthorized intrusion, shutting down the first appliance by the second appliance.

17. The method of claim 11, wherein a communication from the first appliance to the second appliance including the item code comprises a data stream having a number of bits, and further comprising:

discarding a portion of the number of bits by the second appliance; and
using a remaining portion of the number of bits by the second appliance as the item code.

18. The method of claim 11, further comprising:
responsive to terminating the data request, terminating processes of the first appliance; and
rebooting the first appliance.

19. A system, comprising:
a first server computer located behind a firewall and configured to access a secure data system, the first server computer storing a first copy of a current code database, the first server computer providing to a second server computer located before the firewall with a second copy of the current code database;
wherein the first server computer is configured to receive a coded request from the second server computer containing a code selected from the second copy of the current code database, parse the coded request to obtain the code, and verify the code resides in the first copy of the current code database, the first server computer configured only to respond to coded requests from the second server computer having codes corresponding to codes in the first copy of the current code database;
wherein the first server computer is configured to, responsive to determining that the code corresponds to at least one of the codes in the first copy of the current code database, retrieve the data from the secure data system and send the data to the second server computer; and
wherein the first server computer is configured to automatically generate a next code database with different codes and automatically swap the first and second copies of the current code database with respective copies of the next code database according to a predetermined schedule.

20. The system of claim 19, wherein the codes of the current and next code databases are generated by:
assigning a first value to each item in the secure data system;
generating a second, random value for each item in the secure data system; and
combining the first value with the ransom value to obtain a unique value as the code for each respective item in the secure data system.

* * * * *